United States Patent
Alloin et al.

(10) Patent No.: US 9,998,174 B2
(45) Date of Patent: Jun. 12, 2018

(54) POWER LINE COMMUNICATION INTERFERENCE PROBING AND MEASUREMENT ON DIGITAL SUBSCRIBER LINES

(71) Applicant: Ikanos Communications, Inc., Fremont, CA (US)

(72) Inventors: Laurent Alloin, Monmouth Beach, NJ (US); Hassan Afkhami, San Jose, CA (US); Vinay Kumar Chapala, Bangalore, IN (US)

(73) Assignee: Ikanos Communications, Inc., Fremont, CA (US)

( * ) Notice: Subject to any disclaimer, the term of this patent is extended or adjusted under 35 U.S.C. 154(b) by 0 days. days.

(21) Appl. No.: 15/296,463

(22) Filed: Oct. 18, 2016

(65) Prior Publication Data

US 2018/0109288 A1    Apr. 19, 2018

(51) Int. Cl.
*H04B 7/04* (2017.01)
*H04M 3/18* (2006.01)
(Continued)

(52) U.S. Cl.
CPC ............... *H04B 3/542* (2013.01); *H04B 3/56* (2013.01); *H04B 7/0426* (2013.01); *H04M 3/18* (2013.01);
(Continued)

(58) Field of Classification Search
CPC .. H04B 3/54; H04B 3/32; H04B 3/487; H04L 25/085; H04M 7/0024
See application file for complete search history.

(56) References Cited

U.S. PATENT DOCUMENTS

| 9,413,423 B1 * | 8/2016 | Pande | H04B 3/46 |
| 2014/0177694 A1 * | 6/2014 | Alloin | H04B 3/32 |
| | | | 375/227 |

(Continued)

FOREIGN PATENT DOCUMENTS

| WO | WO-2014062967 A1 | 4/2014 | |
| WO | WO 2015144538 A1 * | 10/2015 | ............... H04B 3/32 |

OTHER PUBLICATIONS

Asynchronous Arbiters, William W. Plumber, IEEE Transactions on Computers, vol. c-21, No. 1, Jan. 1972.*

(Continued)

*Primary Examiner* — Ross Varndell
(74) *Attorney, Agent, or Firm* — Holland & Hart LLP/Qualcomm

(57) ABSTRACT

This disclosure provides systems, methods, and apparatus for wireline communication. A digital subscriber line (DSL) receiver may detect one or more power line communication (PLC) sound packets and measure PLC signal leakage on a set of DSL lines based on the detected sound packets. For example, PLC sound packets may be transmitted by PLC devices within a PLC network, and impulse noise received on the set of DSL lines corresponding to the transmitted PLC sound packet may be detected by a DSL receiver (such as a consumer premises equipment (CPE)). The DSL receiver may measure PLC signal leakage on the set of DSL lines based on the detected PLC sound packets. In some cases, the PLC sound packets may be detected based on a duration, a position, or an arrival time of a PLC sound packet.

30 Claims, 16 Drawing Sheets

(51) Int. Cl.
    *H04B 3/54*      (2006.01)
    *H04M 11/06*     (2006.01)
    *H04B 7/0426*    (2017.01)
    *H04B 3/56*      (2006.01)
    *H04B 3/487*     (2015.01)

(52) U.S. Cl.
    CPC .......... *H04M 11/062* (2013.01); *H04B 3/487* (2015.01); *H04B 3/54* (2013.01)

(56) References Cited

U.S. PATENT DOCUMENTS

| | | | | |
|---|---|---|---|---|
| 2014/0369430 A1* | 12/2014 | Parnell | ............... | H04B 3/32 |
| | | | | 375/257 |
| 2015/0009793 A1* | 1/2015 | Schwager | ............... | H04B 3/32 |
| | | | | 370/201 |
| 2015/0171922 A1* | 6/2015 | Du | ............... | H04B 3/54 |
| | | | | 375/222 |
| 2017/0295044 A1* | 10/2017 | Oksman | ............... | H04B 3/32 |

OTHER PUBLICATIONS

Assia, Inc. et al., "G.hn: Broadband Powerline (BPL) interference into VDSL2 on Drop Lines: Measurements and Analyses," Telecommunication Standardization Sector, Jan. 2011, 29 pgs., COM 15-C 1152-E, XP0441145/8, International Telecommunication Union.

ISA/EP, International Search Report and Written Opinion of the International Searching Authority, Int'l Application No. PCT/US2017/052870, Nov. 22, 2017, European Patent Office, Rijswijk, NL, 16 pgs.

Metanoia Technologies Inc. et al., "G.hn, G.vdsl, G.fast : Powerline Interference Indication and Mitigation for DSL Transceivers," Telecommunication Standardization Sector, Jul. 2013, 16 pgs., COM 15-C 0175-E, XP017586609, International Telecommunication Union.

\* cited by examiner

POWER LINE COMMUNICATION INTERFERENCE PROBING AND MEASUREMENT ON DIGITAL SUBSCRIBER LINES

TECHNICAL FIELD

The following relates generally to wireline communications, and more specifically to power line communication (PLC) interference probing and measurement on digital subscriber lines (DSL).

DESCRIPTION OF THE RELATED TECHNOLOGY

The rapid growth of the Internet and the content available through the Internet has increased the demand for high bandwidth connectivity. Digital subscriber line (DSL or xDSL) technology meets this demand by providing data service over twisted pair telephone lines. DSL can be deployed from central offices (COs), from fiber-fed cabinets located near the customer premises, or within buildings. DSL systems typically include multiple bundles of twisted pair wires located within close proximity to each other. In some cases, signals on the twisted pair may be impacted by other wireline communications systems, such as PLC systems. PLC systems utilize electrical wiring within a building as network cables to carry communications between PLC devices. For instance, power lines may be used to transmit and receive modulated data between PLC-capable devices that are connected to the power lines. However, the PLC signals carried on the power lines may create electromagnetic interference, resulting in impulse noise received on the twisted pair of a collocated DSL system, thereby disrupting communications in the DSL system.

In some cases, impulse noise received on the twisted pair may be measured and provided to an arbiter in communication with one or more PLC devices. The arbiter may attempt to mitigate the impact of transmissions from the PLC devices onto the DSL twisted pair for mutual optimization of the two communications systems. As a result, communications efficiency of DSL and PLC systems may benefit from techniques that enhance interoperability and improve PLC interference measurements on DSL lines.

SUMMARY

An apparatus for wireline communications is described. The apparatus may include a processor, memory in electronic communication with the processor, and instructions stored in the memory. The instructions may be operable to cause the processor to detect, by a DSL receiver, impulse noise on a set of DSL lines, detect, by the DSL receiver, one or more PLC sound packets associated with the detected impulse noise, and measure PLC signal leakage on the set of DSL lines based at least in part on the one or more PLC sound packets.

A method of wireline communications is described. The method may include detecting, by a DSL receiver, impulse noise on a set of DSL lines, detecting, by the DSL receiver, one or more PLC sound packets associated with the detected impulse noise, and measuring PLC signal leakage on the set of DSL lines based at least in part on the one or more PLC sound packets.

Another apparatus for wireline communications is described. The apparatus may include means for detecting, by a DSL receiver, impulse noise on a set of DSL lines, means for detecting, by the DSL receiver, one or more PLC sound packets associated with the detected impulse noise, and means for measuring PLC signal leakage on the set of DSL lines based at least in part on the one or more PLC sound packets.

A non-transitory computer readable medium for wireline communications is described. The non-transitory computer-readable medium may include instructions operable to cause a processor to detect, by a DSL receiver, impulse noise on a set of DSL lines, detect, by the DSL receiver, one or more PLC sound packets associated with the detected impulse noise, and measure PLC signal leakage on the set of DSL lines based at least in part on the one or more PLC sound packets.

In some examples of the method, apparatus, and non-transitory computer-readable medium described above, detecting the one or more PLC sound packets further comprises identifying the one or more PLC sound packets based at least in part on at least a duration of a PLC sound packet, or a position of the PLC sound packet, or an arrival time of the PLC sound packet relative to a PLC beacon detected over the set of DSL lines. Some examples of the method, apparatus, and non-transitory computer-readable medium described above may further include processes, features, means, or instructions for determining the duration of the PLC sound packet for use by a PLC device. Some examples of the method, apparatus, and non-transitory computer-readable medium described above may further include processes, features, means, or instructions for transmitting the determined duration to an arbiter.

Some examples of the method, apparatus, and non-transitory computer-readable medium described above may further include processes, features, means, or instructions for determining the position of the PLC sound packet for use by a PLC device. Some examples of the method, apparatus, and non-transitory computer-readable medium described above may further include processes, features, means, or instructions for transmitting the determined position to an arbiter.

In some examples of the method, apparatus, and non-transitory computer-readable medium described above, the arrival time of the PLC sound packet may be associated with an offset from a local time reference. Some examples of the method, apparatus, and non-transitory computer-readable medium described above may further include processes, features, means, or instructions for receiving, from an arbiter, at least the duration of the PLC sound packet or the position of the PLC sound packet used by a PLC device.

In some examples of the method, apparatus, and non-transitory computer-readable medium described above, measuring the PLC signal leakage comprises computing an instantaneous power value for impulse noise received during a measurement period, wherein the instantaneous power value may be from a group consisting of: a maximum instantaneous power, a minimum instantaneous power, and an average instantaneous power. In some examples of the method, apparatus, and non-transitory computer-readable medium described above, the one or more PLC sound packets may be interleaved with PLC data traffic.

Some examples of the method, apparatus, and non-transitory computer-readable medium described above may further include processes, features, means, or instructions for receiving, from an arbiter communicatively coupled with the DSL receiver, instructions to measure the PLC signal leakage. Some examples of the method, apparatus, and non-transitory computer-readable medium described above may further include processes, features, means, or instructions for transmitting the measured PLC signal leakage to the arbiter. Some examples of the method, apparatus, and non-transitory computer-readable medium described above may further include processes, features, means, or instructions for receiving operating parameters from the arbiter based at least in part on the measured PLC signal leakage.

Some examples of the method, apparatus, and non-transitory computer-readable medium described above may further include processes, features, means, or instructions for transmitting the measured PLC signal leakage to an arbiter. Some examples of the method, apparatus, and non-transitory computer-readable medium described above may further include processes, features, means, or instructions for receiving, from the arbiter, instructions to start operation after measuring the PLC signal leakage.

Some examples of the method, apparatus, and non-transitory computer-readable medium described above may further include processes, features, means, or instructions for refraining from transmitting over the set of DSL lines during the measurement of PLC signal leakage. In some examples of the method, apparatus, and non-transitory computer-readable medium described above, the DSL receiver may be a dual sensor receiver comprising a common mode (CM) port and a differential mode (DM) port, and wherein the impulse noise may be detected using the CM port. In some examples of the method, apparatus, and non-transitory computer-readable medium described above, the one or more PLC sound packets comprise a set of medium access control protocol data unit (MPDU) bursts.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
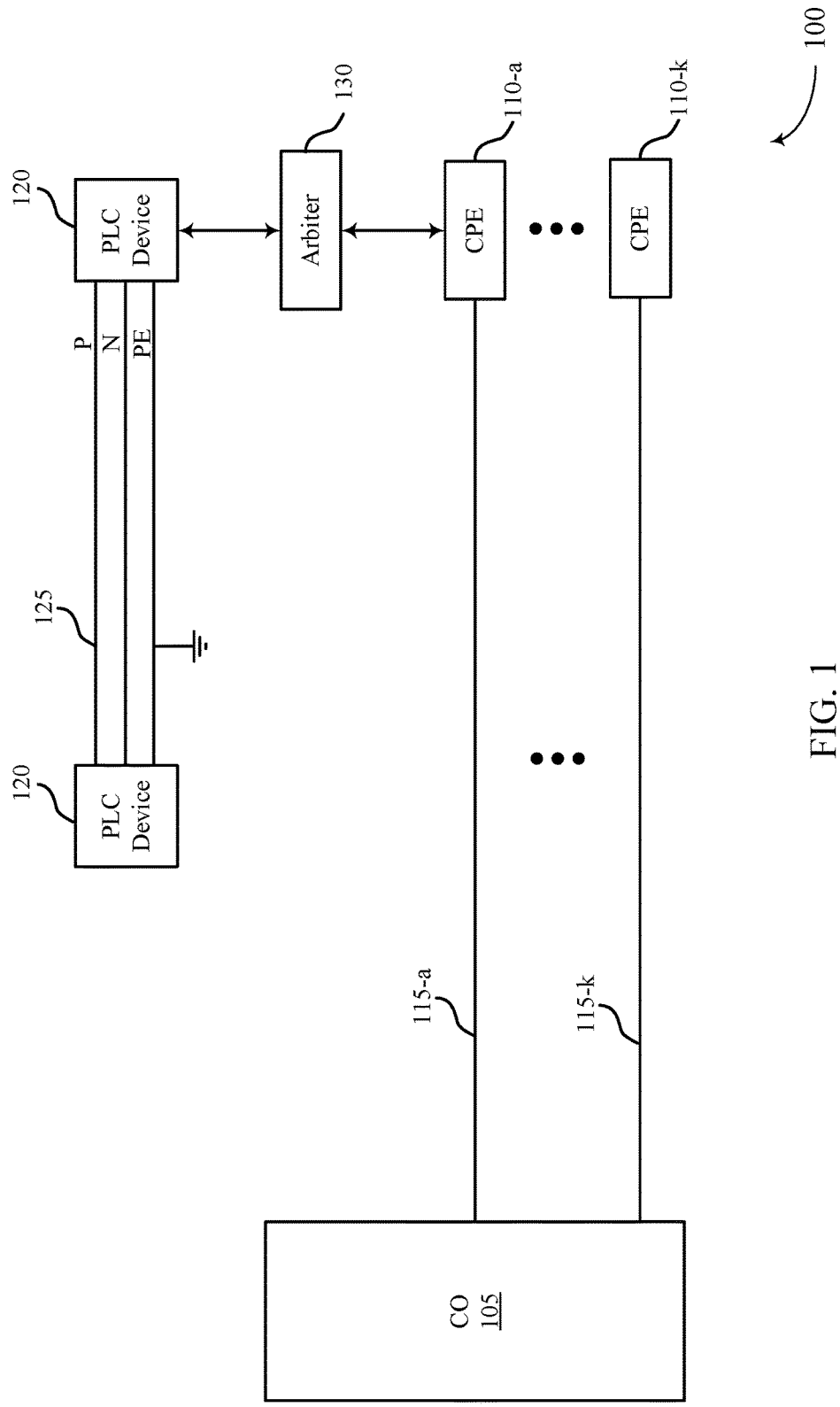
FIG. 1 illustrates an example of collocated wireline communications systems that support power line communication (PLC) interference probing and measurement on digital subscriber lines.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving wireline signals according to any of the ITU-T standards and recommendations, or any of the HPAV standards, or other known signals that are used to communicate within a wireline network.

The described techniques relate to methods, systems, devices, or apparatus that support power line communication (PLC) interference probing and measurement on digital subscriber line (DSL) lines. Generally, the described techniques provide for the detection of one or more PLC sound packets by a DSL receiver, and measuring PLC signal leakage on a set of DSL lines based on the detected sound packets. For example, a DSL receiver may detect impulse noise on a set of DSL lines, and may further detect one or more PLC sound packets associated with the impulse noise. The DSL receiver may then measure PLC signal leakage on the set of DSL lines based on the PLC packets. In some cases, the one or more PLC sound packets may be detected based on a duration, a position, or an arrival time of a PLC sound packet. In some examples, the DSL receiver may communicate the measured PLC signal leakage to an arbiter, and may further transmit, to the arbiter, a determined duration or position of the PLC sound packets to be used by a PLC device, enabling coherent detection of transmitted PLC sound packets. Additionally or alternatively, the PLC device may transmit the duration or position of the PLC sound packets to the arbiter, where the DSL receiver may receive the information from the arbiter, and use the duration and position for coherent detection of the PLC sound packets.

Power line communication (PLC) sound packets may be used as a probing signal for detecting PLC signal leakage on a set of digital subscriber line (DSL) lines (such as a twisted pair). For example, a PLC sound packet may be transmitted between PLC devices within a PLC network, and impulse noise corresponding to the transmitted PLC sound packet may be detected on the set of DSL lines by a DSL receiver (such as a consumer premises equipment (CPE)). The DSL receiver may measure PLC signal leakage on the set of DSL lines based on the detected PLC sound packets.

In some examples, independent control of PLC sound packet transmissions for different PLC couplings may be used to determine which of the different couplings causes greater PLC signal leakage into DSL lines. That is, a PLC device may use a primary coupling (such as a coupling between a phase (P) line and a protected earth (PE) line, referred to as P-PE) or an alternate coupling (such as a coupling between the P and neutral (N) line, referred to as P-N) to communicate, where these coupling may create different impulse noise on the DSL lines based on signal modulation.

Different PLC sound packet transmission schemes may be used to measure PLC signal leakage into a set of DSL lines. For instance, the use of spot beamforming (such as transmissions using a single symbol stream) and eigenvalue precoding, as opposed to single input single output (SISO) modulation, for transmitting sound packets may change the amount of PLC signal leakage into the set of DSL lines. The different amounts of PLC signal leakage associated with different transmission schemes may be due to constructive and destructive effects of primary and alternate couplings experienced by a DSL receiver. Varying PLC signal leakage levels may be due to the use of different transmission schemes associated with the communication between PLC devices. Therefore, the PLC signal leakage from different PLC devices may be measured by the DSL receiver and analyzed with consideration of how the PLC sound packets were transmitted.

PLC sound packets may be detected by a DSL receiver based on a predefined duration, position or time of arrival. For example, combining information about the time of arrival and a sound packet duration may be used to reduce or eliminate the possibility that adjacent PLC data packets of an identical duration to the PLC sound packet from a PLC device (or other PLC devices on the network) are detected as PLC sound packets. Additionally or alternatively, a measurement of PLC signal leakage may be based on an instantaneous power of detected impulse noise on a set of DSL lines.

Particular implementations of the subject matter described in this disclosure can be implemented to realize one or more of the following potential advantages. A sound packet may be used to efficiently characterize signal leakage from PLC devices into a twisted pair, enabling measurement of signal leakage by a DSL device. PLC sound packets also may be configured for different communications schemes, such as SISO or multiple-input multiple-output (MIMO) configurations (where a number of different precoders may be used). Accordingly, different PLC sound packet configurations for SISO and MIMO communication (with and without the use of a precoder) may provide robust techniques for PLC signal leakage measurements on a set of DSL lines. PLC sound packets may be defined in PLC standards for the purpose of sounding channels between PLC devices, and also may be used as a probing sequence to characterize a channel leakage of a PLC device into a DSL receiver, and may be further be interoperable for that purpose. Furthermore, in addition to the SISO and MIMO configurations, a duration and power of a PLC sound packet may be configurable. The use of PLC sound packets for signal leakage measurements may enable a reliable detection and filtering process of a probing signal by a DSL receiver, such as a CPE, that may rely on length or time arrival prediction of the probing signal. Accordingly, a probing sequence may be interleaved with regular PLC traffic between PLC devices, such as to not limit the access to the PLC medium during a measurement period (which may last multiple seconds).

Aspects of the disclosure are initially described in the context of a wireline communications system. Further examples are provided that illustrate PLC sound packet transmissions and process flows for identifying sound packets at a DSL receiver. Aspects of the disclosure are further illustrated by and described with reference to apparatus diagrams, system diagrams and flowcharts that relate to power line communication interference probing and measurement on digital subscriber lines.

FIG. 1 illustrates an example of collocated wireline communications systems 100 that support PLC interference probing and measurement on digital subscriber lines. The collocated wireline communications systems 100 may include CPEs 110 communicatively coupled to a central office (CO) 105 via a cable binder (not shown) and an adjacent PLC network with multiple PLC devices 120 in communication with each other. For example, the collocated wireline communications systems 100 may include a CO 105 that is connected to a number of remote nodes, such as CPEs 110-a through 110-k. The CPEs 110 may be communicatively coupled to the CO 105 via respective subscriber lines, denoted 115-a through 115-k. Each of the subscriber lines 115 may include, for example, one or more twisted-pair copper wire connections. A given CPE 110 may include a modem, a transceiver, a computing device, or other types of communication devices, or combinations of such devices, which are configured to send and receive data to and from CO 105.

The adjacent PLC network within collocated wireline communications systems 100 may include multiple PLC devices 120 communicatively coupled via powerlines 125. The powerlines 125 may be, for example, lines carrying mains electricity within a building and may further be used to transmit and receive modulated data and control signals. For example, powerlines 125 may include a phase (P) line, a neutral (N) line, and a phase earth (PE) line used by PLC devices 120 for communication. The collocated wireline communications systems 100 also may include an arbiter 130 (or arbiter function (AF)) used to communicate with one or more CPEs 110 and one or more PLC devices 120. While the arbiter 130 is shown as a separate structure in FIG. 1, the arbiter 130 may be located within a CPE 110 or other DSL device, such as a component of one of the CPEs 110-a through 110-k. Additionally or alternatively, the arbiter 130 may be part of a PLC network, or remotely connected to the PLC devices 120 and one or more CPEs 110, but not collocated with these devices. In some examples, the collocated wireline communications systems 100 supports the use of PLC sound packets for PLC signal leakage measurement in DSL subscriber lines.

Communications between the CO 105 and the CPEs 110 include both downstream and upstream communications for each of the active subscriber lines 115. The downstream direction refers to the direction from the CO 105 to a CPE 110, and the upstream direction is the direction from the CPE 110 to the CO 105. Although not explicitly shown in FIG. 1, each of the subscriber lines 115 may be coupled to a CO transmitter and a CPE receiver for use in communicating in the downstream direction, and a CPE transmitter and a CO receiver for use in communicating in the upstream direction. On both the CO 105 and CPE 110 side, hardware implementing both a transmitter and a receiver may be generically referred to as a modem or a transceiver.

In some cases, communication signals from the PLC devices 120 may interfere with DSL signal reception. For example, as mentioned above, PLC networking over the powerlines 125 uses existing electrical wiring to carry data signals through the superposition of information signals onto power waves. The powerlines 125 may be unshielded and untwisted, which may cause electromagnetic fields from the information signals to be radiated away from the powerlines 125. The electromagnetic fields may exist for both differential mode (DM) and common mode (CM) currents that flow on the powerlines 125. These electromagnetic fields may couple into the subscriber lines 115 and flow toward the CPE 110, causing interference to a CPE 110. Another potential coupling point may be through a power supply unit (PSU) of a CPE 110. For example, the PSU may have limited CM signal rejection and a CM signal originating from a PLC network may thus produce a CM signal on the subscriber lines 115 that flows away from the CPE 110. In some examples, multiple coupling points may exist between the powerlines 125 and the subscriber lines 115.

CM interference may be converted to DM noise due to imbalances associated with the subscriber lines 115 with respect to a common ground. For example, if a subscriber line 115 is properly balanced (perfect twist) with respect to ground and a CPE 110 has large CM signal rejection on a line side, then the CM interference may not produce any DM noise. However, if any imbalance with respect to ground exists on the subscriber lines 115 or the CPE 110 does not have perfect CM signal rejection, then at least a portion of the CM signal may be converted to DM noise (where the amount may depend on where the CM signal coupling occurs). Thus, PLC signals that are coupled to a DSL network in CM may appear as DM noise on the DSL network.

PLC sound packet physical layer convergence procedure (PLCP) protocol data units (PPDUs) may be used for communications between multiple PLC devices 120. A PLC sound packet PPDU may include a preamble, followed by frame control symbols with guard intervals (GIs) (such as GIs of 3664 samples) and then PLC sound packet symbols. Each of the PLC sound packet symbols may be preceded by a GI (such as a GI of 1512 samples), where the GI length may be associated with a tone map used for the PLC sound packet PPDU (which may be determined by decoding audio-video frame control (AV FC)). A PLC sound packet payload may be used for both SISO and MIMO communications on power lines, and an empty tone filling mechanism may be used to generate binary information for an entire PLC sound packet payload.

In collocated wireline communications systems 100, one or more PLC sound packets may be used as a probing signal that is detected by a DSL receiver, such as a CPE 110. The CPE 110 may measure PLC signal leakage on subscriber lines 115 based on the detected sound packets. For example, a CPE 110-a may detect impulse noise on subscriber lines 115, and may further detect one or more PLC sound packets associated with the impulse noise. The CPE 110-a may then measure PLC signal leakage on the subscriber lines 115 based on the PLC packets. In some cases, the one or more PLC sound packets may be detected based on a duration, a position or an arrival time of a PLC sound packet. In some examples, the CPE 110-a may communicate the measured PLC signal leakage to the arbiter 130, and may further transmit to the arbiter 130 a determined duration or position of the PLC sound packets to be used by the PLC devices 120, enabling coherent detection of transmitted PLC sound packets on the subscriber lines 115. Additionally or alternatively, a PLC device 120 may transmit the duration or position of the PLC sound packets to the arbiter 130, and the CPE 110-a may use the duration and position, received from the arbiter 130, for example, for coherent detection of the PLC sound packets.

Figure 2:
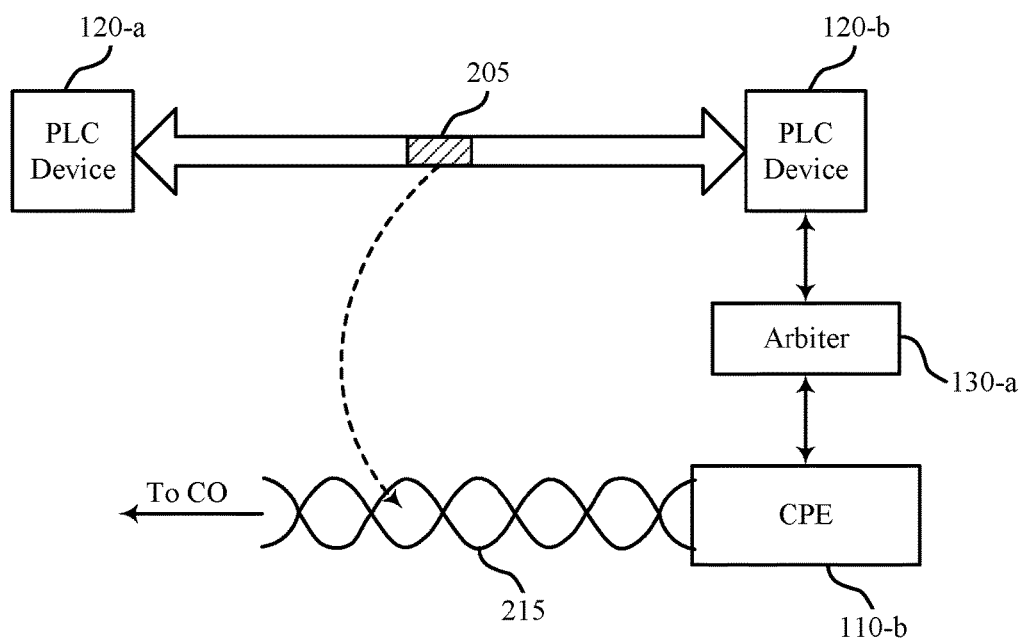
FIG. 2 illustrates an example of collocated wireline communications systems that support PLC interference probing and measurement on digital subscriber lines.

FIG. 2 illustrates an example of collocated wireline communications systems 200 that support PLC interference probing and measurement on digital subscriber lines. The collocated wireline communications systems 200 may include a CPE 110-b communicating with a CO over a set of DSL lines, such as a twisted pair 215. Additionally, the CPE 110 may be located near or within the same premises as a PLC network including PLC devices 120 (such as a first PLC device 120-a and a second PLC device 120-b). The CPE 110-b, the twisted pair 215, and the PLC devices 120-a and 120-b may be examples of the CPE 110, the subscriber lines 115, and the PLC devices 120, respectively, described with reference to FIG. 1. Collocated wireline communications systems 200 may be an example of a system that enables the efficient measurement of PLC signal leakage into DSL subscriber lines through the detection of one or more PLC sound packets.

In the collocated wireline communications systems 200, a PLC sound packet 205 may be used as a probing signal for detecting PLC signal leakage on the twisted pair 215. For example, the PLC sound packet 205 may be transmitted by a PLC device 120, and impulse noise from the PLC sound packet 205 may be detected on the twisted pair 215 by the CPE 110-b.

The PLC sound packets 205 used for measuring PLC signal leakage on the twisted pair 215 may be transmitted by a PLC device 120 using medium access control (MAC) protocol data unit (MPDU) bursting. For example, MPDU bursting is process in which a PLC device 120 transmits multiple MPDUs in a burst (without relinquishing the medium), which allows the PLC device 120 to transmit PLC sound packets 205 almost continuously. The near-continuous transmission of the PLC sound packets 205 may enable efficient measurement of PLC signal leakage on the twisted pair 215 by ensuring that a probing signal is not affected by a response from a receiving PLC device 120, allowing for accurate measurement of impulse noise on the twisted pair 215 associated with a specific PLC device 120.

Independent control of PLC sound packet transmissions for different PLC couplings may be used to determine which of the PLC couplings causes more PLC signal leakage into twisted pair 215. That is, a PLC device 120 may use a primary coupling (P-PE) or an alternate coupling (P-N) to communicate, where these coupling may create different impulse noise on the twisted pair 215 based on signal modulation. Independently controlling transmission of the PLC sound packets 205 on the primary and alternate couplings may enable the CPE 110-b to perform separate measurements of the impact of modulation for the primary and alternate couplings. To differentiate between the PLC sound packet transmissions on different couplings, a gap (such as a clear-to-send (CTS) MPDU gap (CMG)) of a specific duration (such as a duration of 120±0.5 μs)) may be used to provide separation between the start of a transmission on the alternate coupling and an end of a transmission on the primary coupling. The gap (such as the CMG) may enable efficient detection, by CPE 110-b, of the PLC sound packet 205 transmitted on the different couplings.

Accordingly, different PLC sound packet transmission schemes may be used to measure PLC signal leakage into the twisted pair 215. For example, the use of spot beamforming (such as transmissions using a single symbol stream) and eigenvalue precoding (such as transmissions using two symbol streams), as opposed to SISO modulation, for transmitting sound packets may change the amount of PLC signal leakage into the twisted pair 215. In such cases, the different PLC signal leakage associated with different transmission schemes may be due to the constructive and destructive effect of the primary and alternate couplings experienced by the CPE 110-b.

As an example, a first PLC device 120-a may produce different PLC signal leakage on the twisted pair 215 when participating in point-to-point communication with a second PLC device 120-b than when communicating with a third PLC device 120 (not shown). The different PLC signal leakage may be due to the use of different transmission schemes (such as spot beamforming or eigenvalue precoding) associated with the communication between the first PLC device 120-a and the second PLC device 120-b, and communication between the first PLC device 120-a and the third PLC device 120. The different transmission schemes may result in different levels of constructive or destructive interference of a PLC network, which may be then seen as different levels of PLC signal leakage on the twisted pair 215. Therefore, the PLC signal leakage from different PLC devices 120 may be measured and analyzed by the CPE 110-b with consideration of how the PLC sound packet 205 has been transmitted.

In some cases, an arbiter 130-a (also referred to as an arbiter function (AF)) may be used to facilitate measurement of PLC signal leakage on twisted pair 215. In some implementations, the arbiter 130-a may be a component of the CPE 110-b, a component of the PLC device 120-b, implemented using components of both the CPE 110-b and the PLC device 120-b, or a standalone device in communication with both the CPE 110-b and the PLC device 120-b.

The arbiter 130 may instruct the CPE 110-b to perform measurements of PLC signal leakage after instructing one or more PLC devices 120-a through 120-b to transmit PLC sound packets 205 for measurement. PLC leakage measurements on the twisted pair 215 may subsequently be provided to the arbiter 130-a by the CPE 110-b. In some cases, the arbiter 130-a also may communicate operating parameters to the CPE 110-b based on an expected or measured PLC signal leakage. Additionally or alternatively, the arbiter 130-a may communicate operating conditions (such as transmission power, a precoder configuration, etc.) to the one or more PLC devices 120. For example, the arbiter 130-a may communicate operating conditions that support the coexistence of the PLC network and the DSL network based on the measurement(s) completed by the CPE 110-b. The arbiter 130-a also may communicate a predefined duration of the PLC sound packet 205, a position of the PLC sound packet 205, or a possible time of arrival of the PLC sound packet 205 (such as the time of arrival within a beacon period) to provide coherent detection of the PLC sound packet 205 by the CPE 110-b. In some examples, the predefined duration, position, and time of arrival for the PLC sound packet 205 may be determined either by the arbiter 130-a or by the CPE 110-b.

In some cases, the predefined duration and position of the PLC sound packet 205 may be determined by a PLC device 120 and reported to the CPE 110-b, such as through the arbiter 130-a. The predefined duration and position of the PLC sound packet 205 also may be determined through a decision by the arbiter 130-a to impose certain PLC packet duration or position characteristics on PLC devices 120 and CPE 110-b. In such cases, the CPE 110-b and the PLC devices 120 may negotiate, with the arbiter 130-b, what duration and position characteristics are supported by the CPE 110 and the PLC devices 120.

In some examples, a transmission power level of the PLC sound packets 205 may be adjusted during multiple channel estimation processes. That is, after an initial channel estimation process, transmission power back-offs may be applied to subsequent PLC sound packets 205 after a desired power back-off level is determined. The desired power back-off level may be determined based on measurements of PLC signal leakage into the twisted pair 215. Another channel estimation process may be completed by applying the desired power back-off level, transmitting additional PLC sound packets 205, and then measuring the PLC signal leakage again. In some cases, the power back-off may be applied independently to PLC sound packets 205 transmitted on different couplings (such as different power back-off levels applied to primary and alternate couplings).

The PLC sound packets 205 may be identified by the CPE 110-b using a quiet line noise (QLN) measurement process. That is, the PLC sound packets 205 corresponding to the predefined duration, position in a transmission, the time of arrival, or a combination thereof, may be detected as PPDUs that are separate from PLC data packets. In some examples, a CM sensor may be used to detect PLC signal leakage on the twisted pair 215. Because PLC noise may be picked up first as a CM signal on the DSL lines before conversion to DM, a detector triggering on the CM sensor may be used to provide more reliability and sensitivity than a corresponding DM detector. The CM sensor may be used to detect symbols that are impacted by the PLC devices 120 on CM. In some cases, a power spectral density (PSD) measured on the DM also may be identified.

Figure 3:
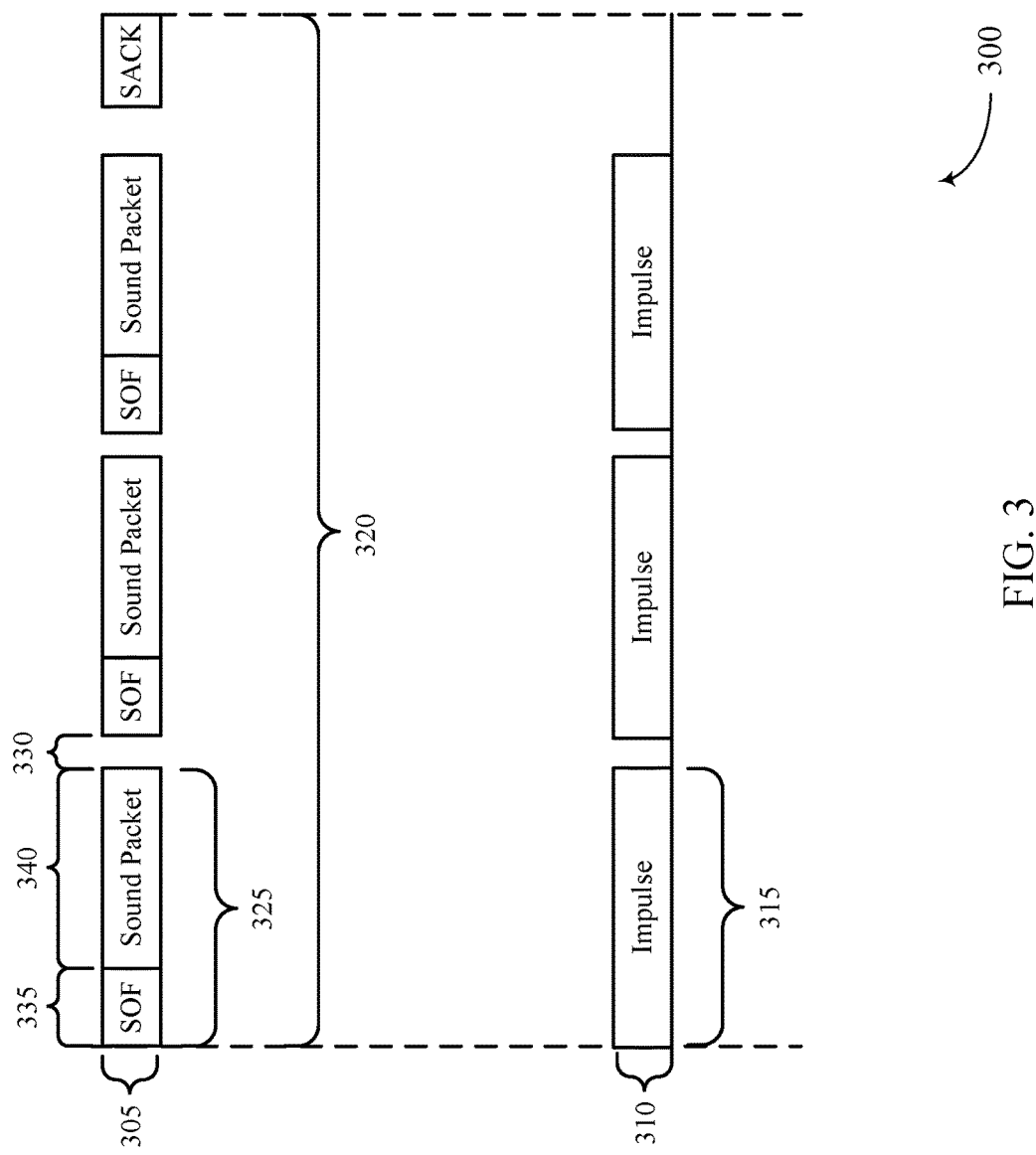
FIGS. 3 and 4 illustrate examples of PLC sound packet transmissions in a system that support PLC interference probing and measurement on digital subscriber lines.

FIG. 3 illustrates an example of a PLC sound packet transmission 300 that supports PLC interference probing and measurement on digital subscriber lines. PLC sound packet transmissions 300 may include a PLC signal 305 transmitted by a PLC device 120 on a set of powerlines and resulting signal leakage 310 received on a set of DSL lines by a CPE 110. The signal leakage 310 may include one or more instances of symbols impacted by impulse noise 315 on the set of DSL lines. Additionally, the instances of impulse noise 315 may correspond to one or more PLC sound packets transmitted by a PLC device 120 within the PLC signal 305, and the CPE 110 may perform measurements of PLC signal leakage based on the impulse noise 315. The PLC sound packet transmission 300 may illustrate the use of PLC sound packets to efficiently characterize PLC signal leakage into a set of DSL lines.

For example, the PLC signal 305 may include an MPDU burst 320, which may allow a PLC device to transmit multiple MPDUs in a burst (without relinquishing the medium). In some cases, the MPDU burst 320 may have a specific duration, and may enable a PLC device 120 to transmit PLC sound packets quasi-continuously, and a measurement of PLC signal leakage based on these PLC sound packets may not be impacted by a response from a receiver. The MPDU burst 320 may include multiple sound packet MPDUs 325 used to transmit data, and the sound packet MPDUs may each be separate by inter-frame spacing 330, such as a BIFS. For example, the inter-frame spacing 330 may be a gap of a specific duration (such as 20±0.5 μs) that allows for a PLC device 120 to send sound packets nearly continuously.

A sound packet MPDU 325 may include a start of frame (SOF) region 335 and a sound packet region 340. The SOF region 335 may enable PLC devices to exchange data and management information. The sound packet region 340 may be structured to facilitate measurement of PLC signal leakage. For example, a PLC sound packet payload may be used for both a SISO mode and a MIMO mode in which an empty tone filling mechanism may be used to generate binary information for the entire PLC sound packet payload.

Figure 4:
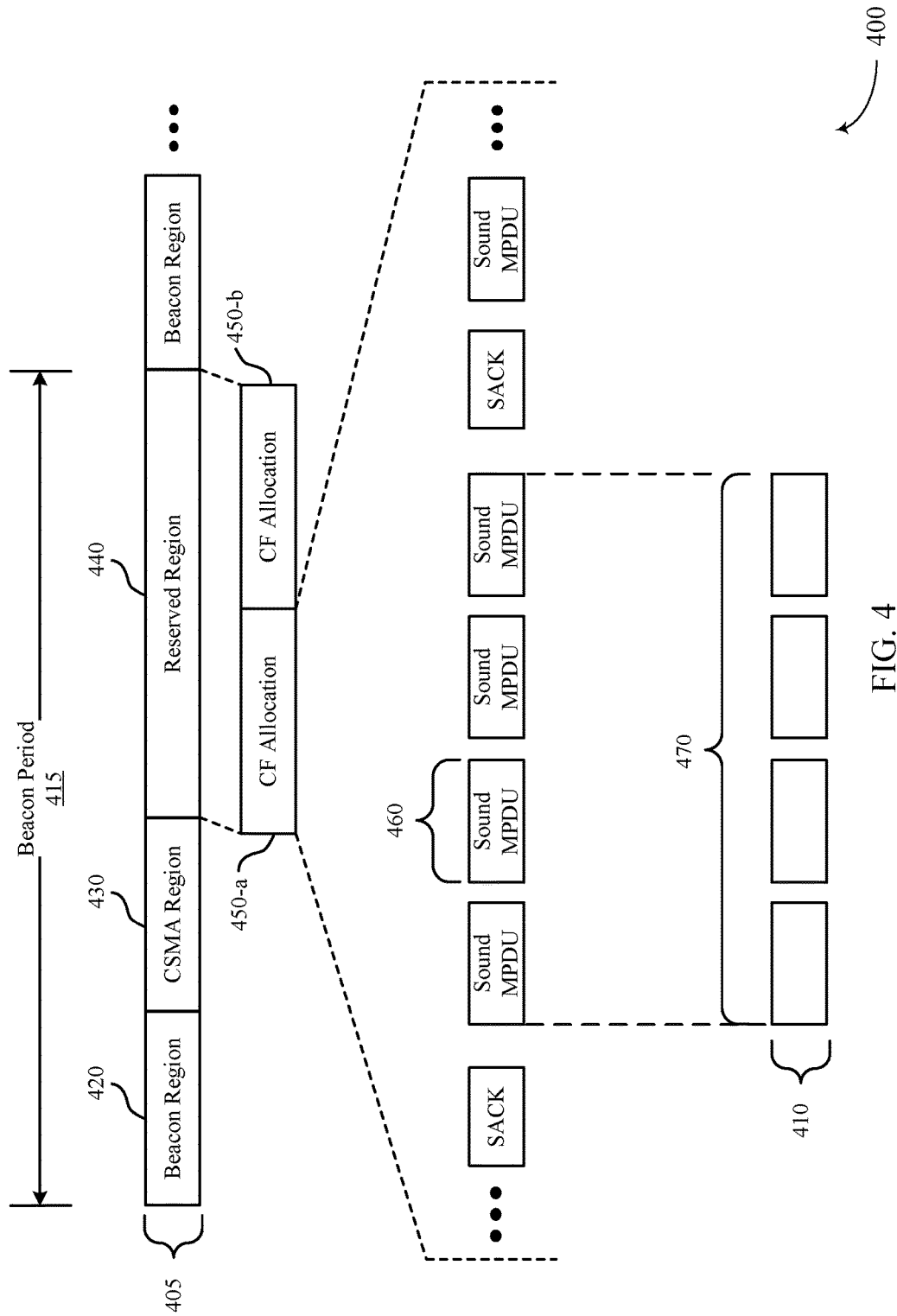

FIG. 4 illustrates an example of PLC sound packet transmission 400 that supports PLC interference probing and measurement on digital subscriber lines. PLC sound packet transmission 400 may include a PLC signal 405 transmitted by a PLC device 120 and a resultant PLC signal leakage 410 received on a set of DSL lines, and detected by a CPE 110. The CPE 110 may perform measurements of PLC signal leakage based on impulse noise that includes one or more PLC sound packets. PLC sound packet transmission 400 may illustrate the use of PLC sound packets to efficiently characterize PLC signal leakage into a set of DSL lines.

The PLC signal 405 may be transmitted over the duration of one or more beacon periods 415, and the beacon period 415 may include a beacon region 420, a carrier sense multiple access (CSMA) region 430, and a reserved region 440. In some cases, PLC sound packets may be transmitted during a contention period (CP), such as the CSMA region 430, or a contention free period (CFP).

During the CP, a transmitting PLC device 120 may contend for a channel prior to sending sound packet MPDUs to a receiving PLC device 120. During the CP, a maximum duration of an MPDU burst (including a response time and a subsequent contention interframe spacing (CIFS)) may be less than or equal to a certain duration (such as a duration of 5000 µs), while the maximum frame length (FL) may be equal to another duration period (such as 2501.12 µs). The MPDU burst may include a number of sound packet MPDUs (such as up to 4 MPDUs) that are transmitted as long as the duration is less than the maximum duration of the MPDU burst.

If the PLC sound packet transmission may be performed in the CFP, the PLC sound packet MPDUs may be transmitted in the reserved region 440 of a beacon period 415. The reserved region 440 may correspond to a specific duration (such as 0.5 ms) and may be made concurrent with the transmission of PLC sound packets to allow proper detection of the beacon period 415 for the purpose of filtering PLC sound packets. For examples, the reserved region 440 may include multiple CF allocations, such as a first CF allocation 450-a and a second CF allocation 450-b, where, for example, the PLC sound packets may be transmitted using the first CF allocation 450-a. The second CF allocation 450-b may be left unallocated, where no sound packets are transmitted, to allow for a synchronized measurement of sound packets.

In some cases, a parameter determining the start of the CF allocation 450-a may be provided to a CPE 110 to enable the CPE 110 to perform a synchronous detection of one or more sound packet MPDUs 460. Additionally, there may be no limitation to the length of an MPDU burst when transmitting within the CF allocation 450-a of the CFP. For example, the length of the MPDU burst may be longer than 5 ms or more than 20 DSL symbols, each symbol having a duration of 250 µs (such as a discrete multitoned (DMT) symbol), between the end of CSMA region 430 and transmission of PLC sound packets. The transmitted sound packet MPDUs may be detected by the CPE 110 as impulse noise 470, and be used to measure PLC signal leakage on the set of DSL lines.

PLC sound packets may be isolated from other PLC data packets that may have an impact on the detection of PLC sound packets. For example, sound packet MPDUs 460 may be scheduled using the CF allocation 450-a, where a gap may exist (such as a gap that lasts the duration of a DMT symbol) between the end of the CSMA region 430 and the sound packet MPDUs 460.

Figure 5:
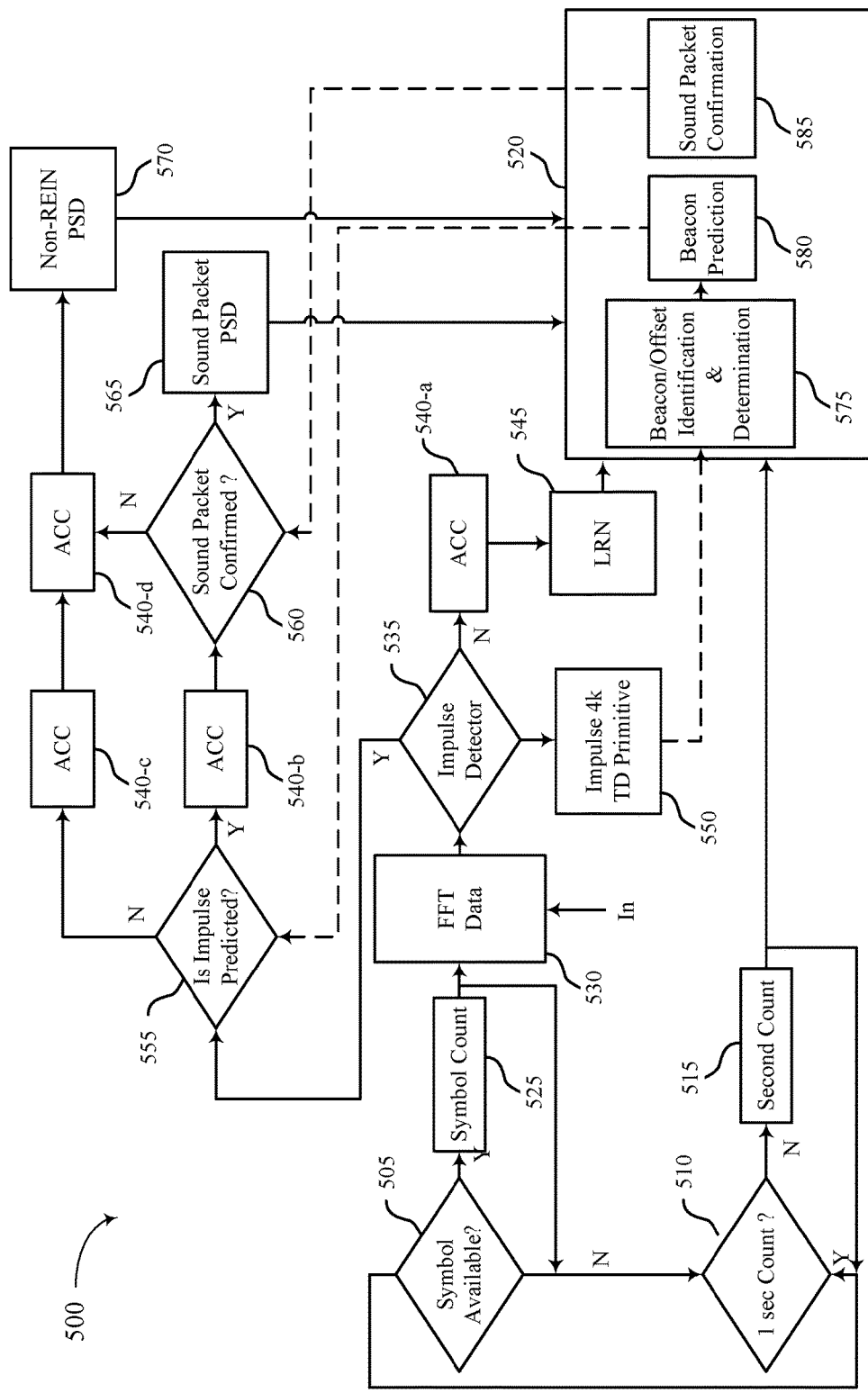
FIGS. 5 through 8 illustrate examples of process flows in systems that support PLC interference probing and measurement on digital subscriber lines.

FIG. 5 illustrates an example of a process flow 500 in a system that supports power line communication interference probing and measurement on digital subscriber lines. The process flow 500 may represent an example of a QLN measurement process in a system that supports the use of PLC sound packets to characterize PLC signal leakage into a twisted pair. Additionally, the process flow 500 may illustrate techniques to enable a separation of impulse and non-impulse impacted symbols on a set of DSL lines.

A QLN measurement process may be used to detect PLC sound packets as impulse noise on DSL lines. The QLN measurement process may be performed while a DSL device, such as a CPE 110 is not active and no transmissions are being sent on the DSL twisted pair. The measurement of PLC signal leakage also may be performed while the DSL device is receiving useful data on the DSL twisted pair. As an example, in a QLN measurement process, fast Fourier transform (FFT) output data may be first produced at a specific rate, where, in case the CPE 110 is receiving useful data on the DSL twisted pair, the FFT output may include data from which DSL useful data may be subtracted. For instance, when a modem of the CPE 110 receives DSL useful data, an output of a slicer that eliminates the DSL useful data signal from a FFT output, which may have been equalized to facilitate the slicing operation, may be accumulated. In the presence of a useful DSL signal, an accumulated slicer error for detection of a PLC signal may be equivalent to the FFT output when no useful signal is present (such as with a scaling factor difference).

The output data may be accumulated over a window interval of a specific period (such as a period of 1 second) in separate accumulations, which may be based on an output of an impulse detector or predictor. The separate accumulations may include DSL symbols that were not impacted by impulse noise, DSL symbols that were predicted but impacted by impulse noise, and DSL symbols that were not predicted and were also impacted by impulse noise. The accumulation process may be used to extract information from a structured pulse train that may be immersed in a random non-stationary pulse train produced by a PLC network, which includes PLC devices 120 that may start and stop transmitting at times that may be not predictable for a DSL device, such as a CPE 110. Thus, impulses from PLC sound packet transmissions may be isolated by the CPE 110.

In some examples, and as discussed below, the QLN measurement process may be used to identify PLC sound packets based on a time of arrival of the PLC sound packet. For example, a structured signal identification may be performed over a period (such as on a per-second basis) based on an impulse time domain array collected during a period. In some cases, identification of a central coordinator (CCO) beacon may be first performed and characterized by a particular offset with a local time reference. Identification of PLC sound packets may be then performed and characterized by a different offset with respect to the local time reference, or may be performed autonomously (such as without receiving an offset). During a subsequent time period, DSL symbols impacted by a transmission of the PLC sound packets may be identified and accumulated. The presence of the PLC sound packets may be also confirmed, and a PLC sound packet offset may be updated for a subsequent time period. Additionally or alternatively, a validation may be performed for accumulated DSL symbols that are predicted and impacted by impulse noise. A prediction and averaging of DMT symbols impacted by the PLC sound packets may be determined based on the detection of the CCO beacon and the offset of the PLC sound packets (such as an offset with respect to the CCO beacon given to a DSL receiver). The measurement of PLC leakage into the DSL twisted pair may be associated with a noise PSD (referred to as line referred noise (LRN)) when the CPE 110 is not receiving DSL data, or may be associated with a signal to noise ratio (SNR) when the CPE 110 is performing a PLC signal leakage measurement while receiving useful data.

The process flow 500 may include a number of processes performed by a device, such as the CPE 110 described with reference to FIGS. 1 and 2. For example, process flow 500 may be an example of a state diagram with time stamps that continuously increment. In some cases, aspects of the process flow 500 may be controlled by an arbiter 130, where the arbiter 130 may indicate to one or more PLC devices 120 to send PLC sound packets, and one or more CPEs 110 may begin a PLC signal leakage measurement procedure on a set of DSL lines (such as a twisted pair). The process flow 500 may occur as part of a QLN measurement process in which CPEs 110 coupled with the twisted pair may refrain from transmitting until the QLN measurement process is completed, while communications by PLC devices 120 are not interrupted.

At block 505, a CPE 110 may determine if a symbol is available, where the symbol may correspond to a predetermined rate (such as a baud rate of 4 kHz or 48 kHz). The predetermined rate may be based on a rate used by a CPE 110 running in showtime. Additionally, the CPE 110 may determine whether a certain duration has passed (such as 1 second) at block 510. For example, the CPE 110 may identify symbols received at a 4 kHz baud rate, and after 4000 of such symbols are received, the CPE 110 may determine that a second has passed. In other examples, the determination of a one second duration may take place for symbols received at different baud rates, or different durations may be determined based on the received symbols, such as a quarter of a second, a half second, etc. After the CPE 110 determines that a certain duration has passed, a counter (such as a one second counter) may increment at block 515, and the process may return to block 505 with an incremented time stamp.

When a symbol is available at block 505, such as when the time stamp has incremented by 250 us (the length of a full symbol), then a symbol counter may increment the time stamp at block 525, and a per-symbol FFT process of taking FFT data may be performed at block 530. For example, at block 530, demodulated FFT output data may be produced, where the FFT output data may be produced at a specific rate that may be equal to the predetermined rate of block 505. As mentioned above, the FFT output may include a version of data from which useful data received on a set of DSL lines may be subtracted (such as noise that remains after demodulation or slicing of the DSL data).

At block 535, symbols impacted by impulses may be detected. In some cases, dedicated hardware (such as an impulse detector) or dedicated software may be used to detect symbols that have been impacted by impulses, such as impulses due to PLC signal leakage into the set of DSL lines. In some cases, the impulses may be detected based on a measurement of a power level. If no impulses are detected at block 535, the symbols may be collected in an accumulation process at block 540-*a*. Accumulated symbols may then be used to produce a measurement of background noise at block 545, which may be referred to as LRN. The background noise measurement may then be used at block 520, where the LRN may be used for additional processing to assist in a determination of the impact of the PLC signal leakage on DSL lines.

From block 535, if symbols impacted by impulse have been detected, the symbols may be collected in an array (such as a time domain primitive array) of a specific length (such as a length of 4000 symbols) at block 550. The symbols may be collected into the array over a time period (such as over 1 second) and the array may indicate which of the symbols (over the time period) have been impacted by impulses. As an example, the array may contain a series of bits to indicate whether or not a specific symbol was impacted by impulses, where a bit value of 0 may indicate that a specific symbol was not impacted by impulses and a bit value of 1 may indicate that the symbol was impacted by impulses. The array may then be used at block 520 for additional processing to assist with the determination of the impact of the PLC signal leakage on the DSL lines.

Additionally or alternatively, if impulses are detected at block 535 the CPE 110 may use further procedures to identify PLC sound packets as part of impulse noise on the DSL lines. For instance, at block 555, a determination may be made as to whether the impulses were predicted. That is, the CPE 110 may, for example, identify a predicted impulse based on a determined time of arrival of the impulse. If impulses were predicted, impulse impacted symbols may be collected in an accumulation process at block 540-*b*. Subsequently, a determination may be made at block 560 whether the impulse is associated with a PLC sound packet using input from block 520, as discussed below.

At block 565, if sound packets were confirmed to be transmitted during a time corresponding to the impulse impacted symbols, a sound packet PSD may be determined at block 565. The sound packet PSD may include measured power levels in the DSL lines associated with transmission of PLC sound packets. In some cases, the sound packet PSD may be then be used at block 520, which may perform additional processing to assist with a determination of the impact of the PLC signal leakage on DSL lines.

From block 555, if the impulses corresponding to any impacted symbols were not predicted, the symbols may be collected in an accumulation process at block 540-*c*. The symbols may be further collected along with any symbols that were determined not to be associated with a transmission of PLC sound packets at block 560 in a subsequent accumulation process at block 540-*d*. A non-repetitive electrical impulse noise (non-REIN) PSD may then be determined from the accumulated symbols of block 570, and the non-REIN PSD may then be used at block 520.

The functions performed at block 520 may be used for the characterization of impulse noise from PLC devices on a set of DSL lines. The functions at block 520 also may provide information to the CPE 110 to assist with decisions made at various blocks. As an example, after receiving the array associated with impulse impacted symbols at block 550, an identification and determination process may be performed at block 575. For instance, there may be a post-analysis of the array performed every second which may be used to detect the presence of a PLC beacon transmission by a PLC device 120 (such as at the rate of 25 or 30 Hz). The identification and determination process at block 575 may include identification of a CCO beacon, determination of a CCO beacon offset, identification of PLC sound packets, and determination of a PLC sound packet offset. Accordingly, the identification and determination process at block 575 may be used to construct a beacon prediction at block 580, which may be used to determine whether impulses were predicted at block 555. The functions of block 520 also may be used to inform the CPE 110 about transmissions of sound packets after confirming such transmissions at block 585. In some cases, the sound packet confirmation of block 585 may be used at block 560 to determine whether a symbol was impacted by a PLC sound packet.

Figure 6:
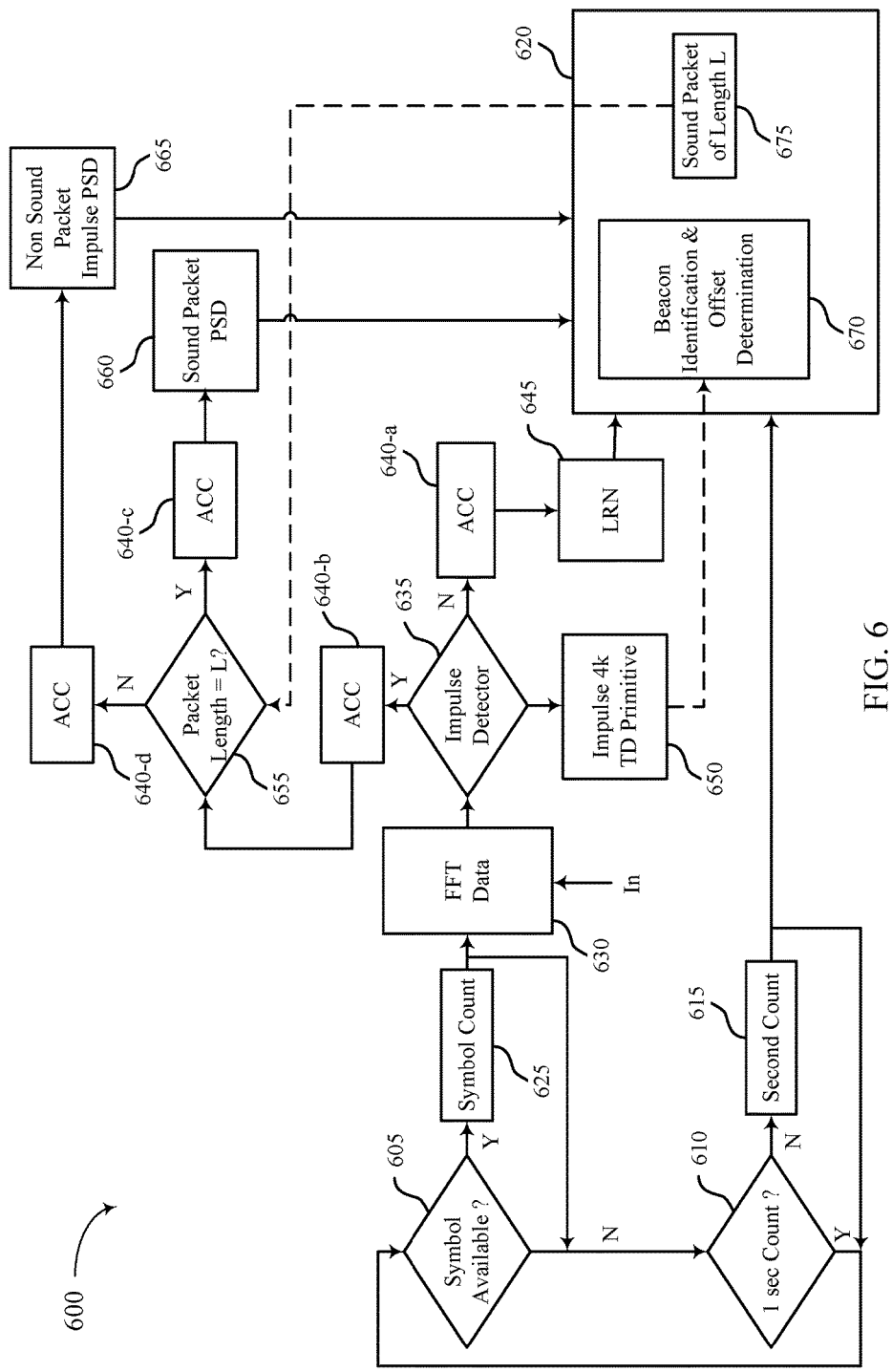

FIG. 6 illustrates an example of a process flow 600 in a system that supports PLC interference probing and measurement on digital subscriber lines. The process flow 600 may illustrate steps performed by a CPE 110 during a QLN measurement process to facilitate the characterization of PLC signal leakage into a set of DSL lines. For example, process flow 600 may be an example of a state diagram with time stamps that continuously increment. Additionally, the process flow 600 may illustrate techniques to enable a separation of impulse and non-impulse impacted symbols on the set of DSL lines.

As described below, a QLN measurement process may be used to identify PLC sound packets of a predefined duration. For example, the predefined duration of the PLC sound packets may be configured to be an integer number of orthogonal frequency division multiplexing (OFDM) symbols. A noise finder averaging process may be used to measure the duration of the PLC sound packets and filter (with a high proficiency) transmissions from only a desired PLC device. For example, multiple PLC devices 120 may exist on a PLC network, and signal leakage from each PLC device 120 may be measured independently. Each PLC device 120 may consecutively transmit a PLC sound packet of a given duration, such as sound Packets having either the same duration as other PLC devices 120 or a different duration, and the CPE 110 may filter the PLC sound packets based on their duration. In some examples, filtering of the PLC sound packets may be not dependent on when the PLC sound packets are transmitted.

The process flow 600 may include a number of procedures performed by a CPE 110, such as a CPE described with reference to FIGS. 1 and 2. Aspects of the process flow 600 may be controlled by an arbiter 130, where the arbiter 130 may, for example, indicate to a DSL receiver to start a measurement procedure or indicate to one or more PLC devices 120 to send PLC sound packets for the measurement procedure.

In the process flow 600, the functions performed at blocks 605, 610, 615, 625, 630, 635, 640-*a*, 645 and 650 are similar to the functions performed at the respective blocks of the process flow 500 described with reference to FIG. 5 and will not be repeated here for the sake of brevity.

Following a determination, at block 635, that symbols have been impacted by impulses, the impulse impacted symbols may be accumulated at block 640-*b*. At block 655, the CPE 110 may determine if the packet duration is equal to a predetermined duration. For example, a duration of a PLC sound packet may have been determined prior to a QLN measurement process, and the CPE 110 may determine whether the duration of the impulse that affected one or more symbols is the same as the predetermined duration of the PLC sound packet. When the impulse duration is equal to the predetermined duration, the associated symbols may be accumulated at block 640-*c*, and at block 660, the CPE 110 may determine a sound packet PSD. The sound packet PSD may include measured power levels in the DSL lines associated with transmission of PLC sound packets. In some cases, the sound packet PSD may be then be used at block 620 to perform additional processing to assist with a determination of the impact of the PLC signal leakage on DSL lines.

Additionally or alternatively, symbols affected by an impulse of a duration that is different than the predetermined duration, as determined at block 655, may be accumulated at block 640-*d*. These accumulated symbols may then be used at block 665 to determine a non-sound packet impulse PSD. In some cases, the non-sound packet impulse PSD may be used at block 620 for the characterization of PLC signal leakage into DSL lines.

The functions performed at block 620 may provide information to the CPE 110 to assist with decisions made at various blocks. As an example, after receiving the array associated with impulse impacted symbols at block 650, an identification and determination process may be performed at block 670. The identification and determination process of block 670 may include an identification of a CCO beacon and determination of a CCO beacon offset. In some cases, at block 620, the CPE 110 also may determine the duration of sound packets as part of sound packet identification process at block 675. In some cases, sound packet identification process may be used to determine whether sound packets have a duration that may be equal to the predetermined duration at block 655.

Figure 7:
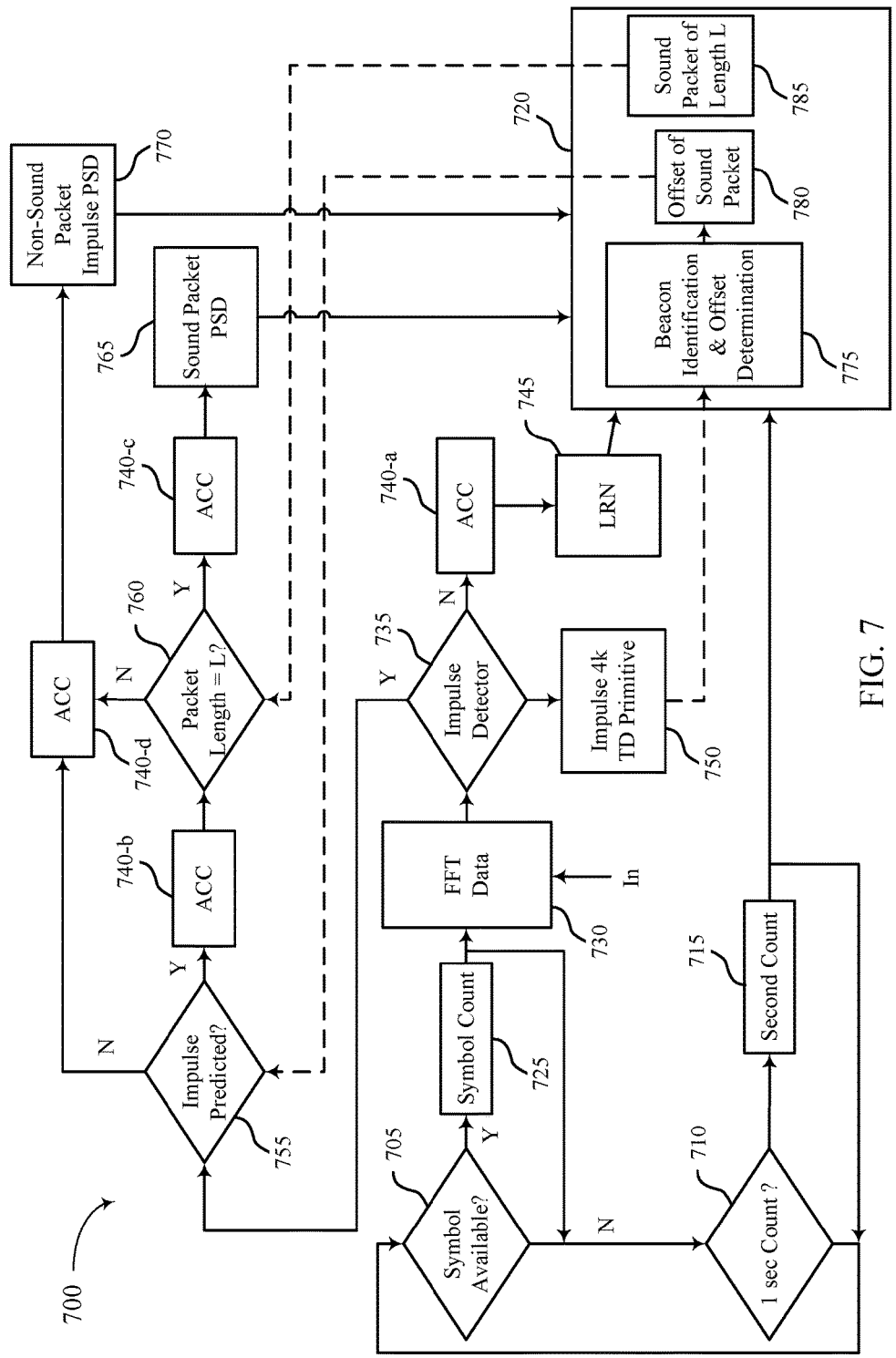

FIG. 7 illustrates an example of a process flow 700 in a system that supports PLC interference probing and measurement on digital subscriber lines. The process flow 700 may illustrate steps performed by a CPE 110 during a QLN measurement process to facilitate the characterization of PLC signal leakage into a set of DSL lines. For example, the process flow 700 may be an example of a state diagram with time stamps that continuously increment. Additionally, the process flow 700 may illustrate techniques to enable a separation of impulse and non-impulse impacted symbols on the set of DSL lines.

PLC sound packet detection based on a predefined duration and a time of arrival may be used to provide additional flexibility to a PLC sound packet filtering process. That is, combining information about the time of arrival and a sound packet's duration (such as using a predefined time division multiple access (TDMA) slot) may be used to reduce or eliminate the possibility that adjacent data packets of an identical duration to the PLC sound packet from a PLC device 120 (or other PLC devices 120 on the network) may be detected and filtered as PLC sound packets. In some examples, if a time of arrival or offset for the sound packet is not provided to the CPE 110, the filtering process may default to filtering based on the PLC sound packet duration. Alternatively, if only the time of arrival of the sound packet is provided, or if neither the time of arrival or duration of the sound packet are provided, and the transmission occurs synchronously within a beacon period, then the filtering process may default to a QLN process used for detecting PLC sound packets, such as process flow 500 described with reference to FIG. 5. Additionally or alternatively, a TDMA region of the beacon period may be used for determining the time of arrival for a sound packet.

The process flow 700 may include a number of procedures performed by a CPE 110, such as a CPE 110 described with reference to FIGS. 1 and 2. Aspects of the process flow 700 may be controlled by an arbiter 130, where the arbiter 130 may, for example, indicate to a DSL receiver to start a measurement procedure or indicate to one or more PLC devices 120 to send PLC sound packets for the measurement procedure.

In the process flow 700, the functions performed at blocks 705, 710, 715, 725, 730, 735, 740-*a*, 745 and 750 are similar to the functions performed at the respective blocks of the process flow 500 and the process flow 600 described with reference to FIGS. 5 and 6, respectively, and will not be repeated here for the sake of brevity.

Following a determination, at block 735, that symbols have been impacted by impulses, at block 755, the CPE 110 may determine whether the impulses were predicted. For example, the CPE 110 may identify a predicted impulse based on a time of arrival or an offset associated with the impulse. If the impulses were predicted, the associated symbols may be collected in accumulation process at block 740-*b*, and the CPE 110 also may determine whether the duration of the impulse that affected one or more symbols is the same as the predetermined duration of the PLC sound packet. If the impulse impacting one or more symbols is equal to the predetermined duration of the PLC sound packet, those symbols may be accumulated at block 740-*c*. Subsequently, a PLC sound packet PSD may be determined at block 765, which may be used at block 720 for additional processing to assist in a determination of the characterization of the PLC signal leakage on DSL lines.

At block 755, any symbols affected by impulses that are not predicted may be subsequently accumulated at block 740-*c*, along with any symbols that are affected by an impulse of a duration that is different than the predefined duration, and a PSD for symbols by an impulse not corresponding to a PLC sound packet may be determined at block 770.

The functions performed at block 720 may be used for the characterization of impulse noise from PLC devices on a set of DSL lines. In some cases, aspects of the functions performed at block 720 also may be used for the determinations made during process flow 700. For example, after receiving the array associated with impulse impacted symbols at block 750, an identification and determination process may be performed at block 775. For instance, there may be a post-analysis of the array performed every second which may be used to detect the presence of a PLC beacon transmission by a PLC device 120 (such as at the rate of 25 or 30 Hz). The identification and determination process at block 775 may include identification of a CCO beacon, determination of a CCO beacon offset, identification of PLC sound packets, or determination of a PLC sound packet offset. Accordingly, the identification and determination process at block 775 may be used to construct a beacon prediction at block 780, which may be used to determine whether impulses were predicted at block 755. Additionally, a predefined duration of PLC sound packets may be identified at block 785, which may be used for the decision at block 760 as described above.

Figure 8:
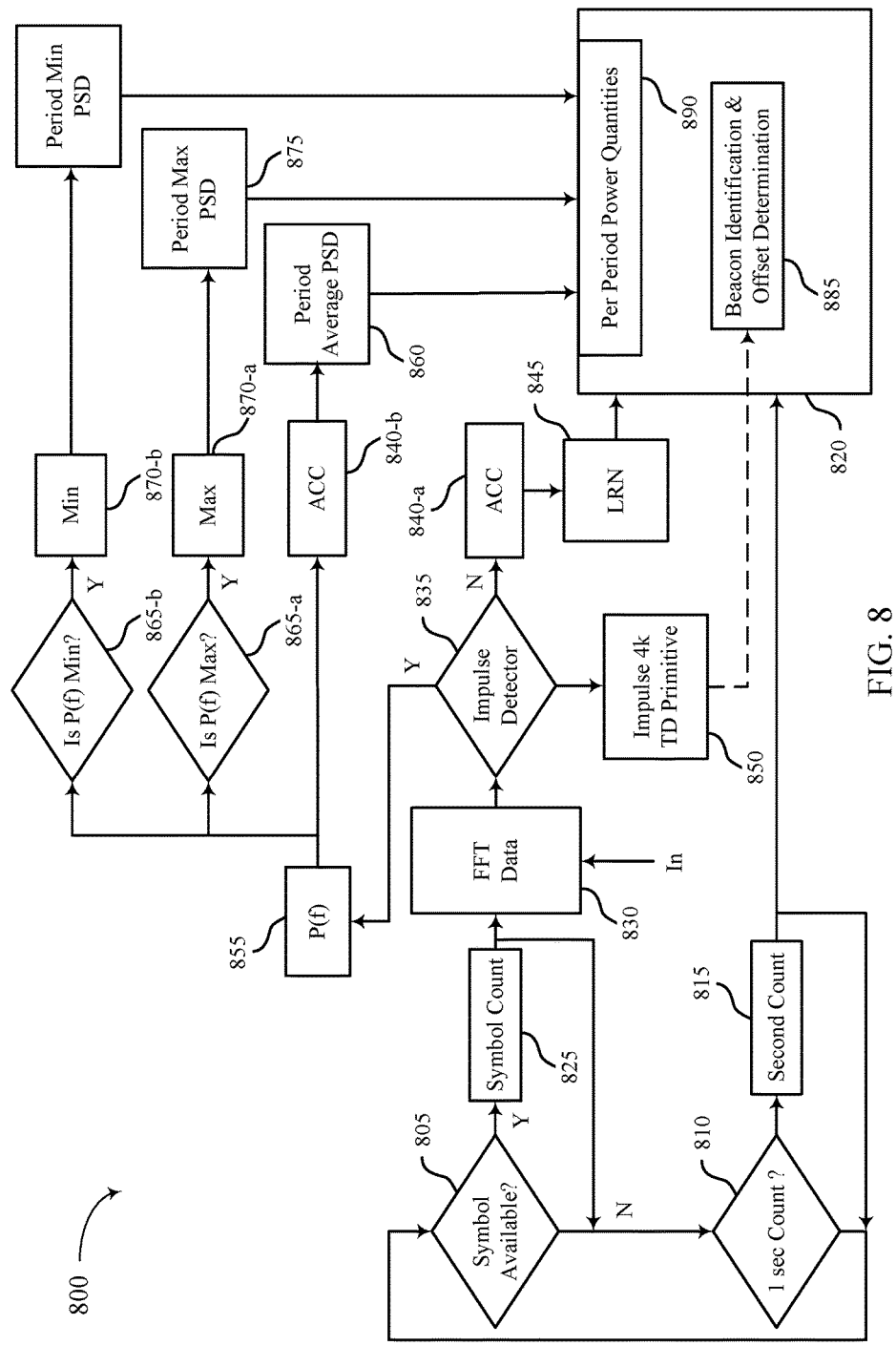

FIG. 8 illustrates an example of a process flow 800 in a system that supports PLC interference probing and measurement on digital subscriber lines. The process flow 800 may illustrate steps performed by a CPE 110 during a QLN measurement process to facilitate the characterization of PLC signal leakage into a set of DSL lines. For example, the process flow 800 may be an example of a state diagram with time stamps that continuously increment. Additionally, the process flow 800 may illustrate techniques to enable a derivation of minimum, maximum, and average instantaneous power of multiple impulses received on a set of DSL lines.

In some cases, a measurement of PLC signal leakage may be based on an instantaneous power of detected impulse noise. This measurement process may be used in the event that transmission of independent PLC sound packets may be not possible, or if the PLC sound packets are immersed in data traffic from other PLC devices 120 that cannot be filtered out using an averaging process. For each impulse impacted symbol, an instantaneous power of the symbol may be computed on a per-tone basis. Next, a maximum instantaneous power across all impulse symbols over a time period may be determined. A maximum, minimum, and average instantaneous power per-tone also may be determined for multiple time periods over the total measurement period. The measurement of instantaneous power may allow for a determination of significant PLC interferers, such as PLC devices 120 that contribute the most to PLC signal leakage. This determination may be made for all of the PLC devices, regardless of how long an individual PLC device transmits. In some cases, an arbiter 130 may identify a PLC device 120 that contributes the most to the PLC signal leakage by requesting each transmitting PLC device 120 to perform a maximum power cutback (such as by using a predetermined sequence), or the arbiter 130 may request that all of the PLC devices perform a conservative power cutback.

The process flow 800 may include a number of procedures performed by a CPE 110, such as a CPE 110 described with reference to FIGS. 1 and 2. Aspects of the process flow 800 may be controlled by an arbiter 130, where the arbiter 130 may, for example, indicate to a CPE 110 to start a measurement procedure and indicate to one or more PLC devices 120 to send PLC sound packets for the measurement procedure.

In the process flow 800, the functions performed at blocks 805, 810, 815, 825, 830, 835, 840-a, 845 and 850 are similar to the functions performed at the respective blocks of the process flow 500, the process flow 600 and the process flow 700, described with reference to FIGS. 5, 6, and 7 respectively, and will not be repeated here for the sake of brevity.

Following a determination, at block 835, that one or more symbols have been impacted by an impulse, an instantaneous power of impulse impacted symbols may be measured at block 855, where, for example, an instantaneous power is computed on a per-tone basis. The instantaneous power measured at block 855 may then be used in different way. For example, information about the instantaneous power of the impulse impacted symbols may be collected during an accumulation process at block 840-b. The accumulated instantaneous power information from block 840-b may be used at block 860 to determine an average PSD over a given time period (such as over 1 second). The average PSD may then be used at block 820 for additional processing and analysis associated with a characterization of the impact of PLC signal leakage on DSL lines.

In another example, the instantaneous power determined at block 855 also may be analyzed at block 865-a and block 865-b to determine whether it is a maximum power or minimum power, respectively, over a given period, such as a 1 second period. For instance, at block 865-a, a per-tone comparison may be made to determine if the instantaneous power may be the maximum over a given time period. Accordingly, the information associated with the per-tone maximum instantaneous power for a given time period may then be collected at block 870-a. After collecting information about a maximum power at block 870-a, a maximum PSD for the period may be determined at block 875. The maximum PSD may then be used at block 820 for additional processing and analysis associated with the maximum PSD to assist with a determination of the impact of PLC signal leakage on DSL lines.

Similarly, at block 865-b, a per-tone comparison may be made to determine if the instantaneous power is a minimum instantaneous power over a given time period, and this information may be collected at block 870-b. A minimum PSD for the period may be determined at block 880.

In some cases, after receiving an array associated with impulse impacted symbols at block 850, the CPE 110 may perform an identification and determination process at block 885. The identification and determination process at block 885 may include identification of a CCO beacon and determination of a CCO beacon offset. Additionally, the average PSD, maximum PSD and minimum PSD may be accumulated at block 890 as part of a measurement of per-period power quantities. That is, for each time period, the CPE 110 may use the average PSD, maximum PSD and minimum PSD to determine significant PLC interferers.

Figure 9:
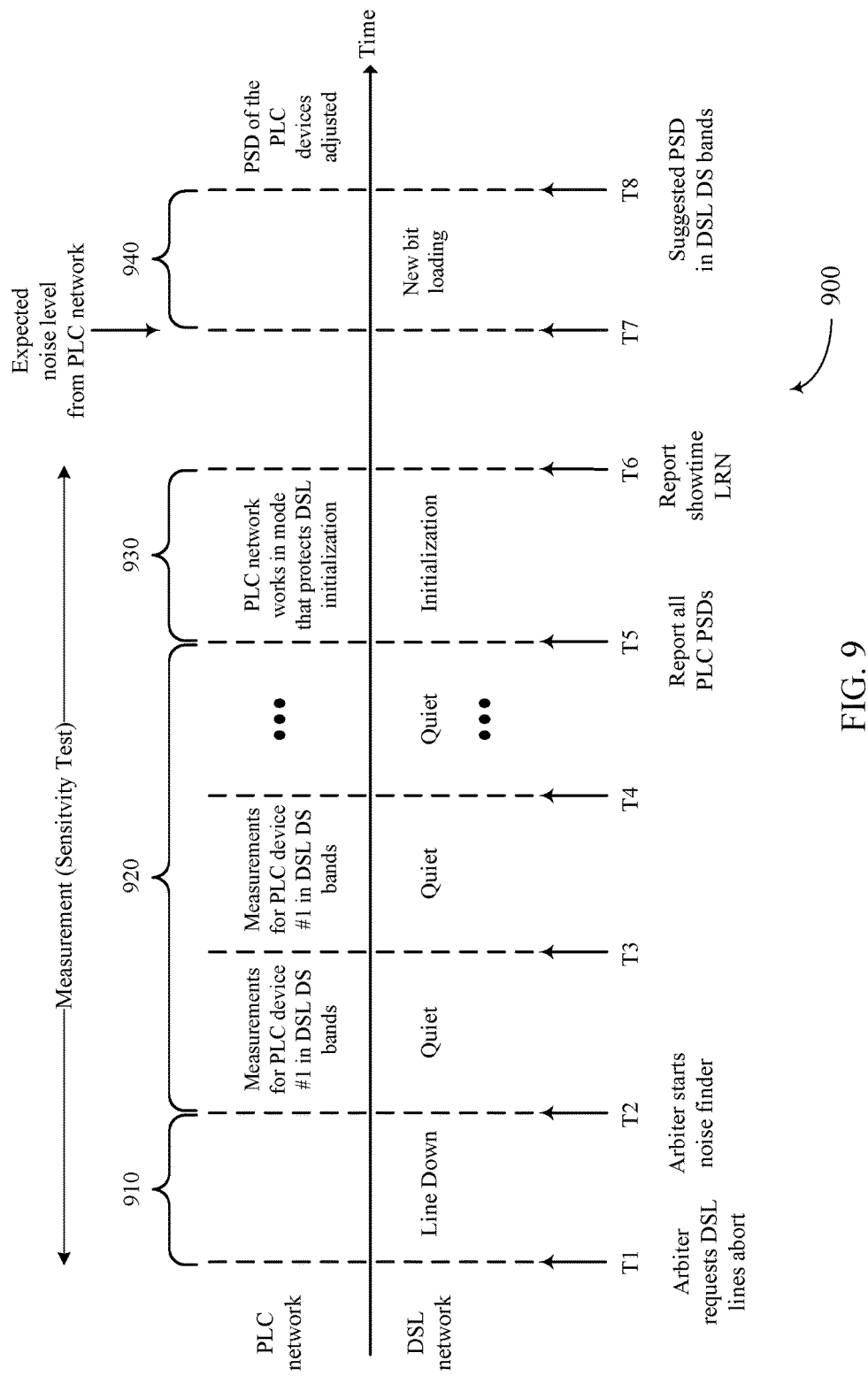
FIG. 9 illustrates an example of a noise finder measurement sequence that supports PLC interference probing and measurement on digital subscriber lines.

FIG. 9 illustrates an example of a noise finder measurement sequence 900 that supports PLC interference probing and measurement on digital subscriber lines. For example, the noise finder measurement sequence 900 may be used for measuring and mitigating PLC signal leakage into a set of DSL lines in accordance with various aspects of the present disclosure. The noise finder measurement sequence 900 may include a number of sessions, during which PLC signal leakage measurements may be made. In some cases, an arbiter 130 may communicate with a PLC network and a DSL network to send instructions to devices to transmit one or more PLC sound packets and perform measurements for the transmitted PLC sound packets.

The noise finder measurement sequence 900 may include a number of measurements performed on a set of DSL lines, where a CPE 110 refrains from transmitting on the set of DSL lines, and one or more PLC devices 120 may transmit, while communicating with other PLC devices 120, one or more PLC sound packets used for detecting impulse noise.

During a first time period 910, a set of DSL lines may be brought down between time T1 and time T2. That is, a CPE 110 may refrain from transmitting during first time period 910, or an arbiter 130 may request the CPE 110 to abort transmissions, or the set of DSL lines may be brought down through some other indication. Bringing the DSL line down may prevent any transmissions from being sent on the set of DSL lines that may interfere with measuring PLC signal leakage.

Starting at time T2, measurements of the impact on PLC signal leakage for one or more PLC devices 120 may be performed during a second time period 920. For example, the set of DSL lines may remain quiet during the second time period 920. Accordingly, a separate noise finder session may be started for each PLC device on the PLC network and then stopped when measurements for the particular device (for which each noise finder session was started) have been completed. For instance, a measurement for a first PLC device 120 may take place between time T2 and time T3, and a subsequent measurement for a second PLC device 120 may take place between time T3 and time T4, and so on.

Measurements on the set of DSL lines may be collected in a list for each of the PLC devices 120 on the PLC network, and the list may be reported to the arbiter 130. In some cases, a single noise finder session may begin at the start of second time period 920 and end once all measurements have been taken for each PLC device 120. The measurements may be reported once the noise finder sessions have completed. In some examples, the arbiter 130 may communicate with PLC and DSL devices on the networks to start and stop noise finder sessions, and the arbiter may instruct a specific PLC device to begin transmitting PLC sound packets and request a CPE 110 to begin measuring PLC signal leakage.

Once the measurements taken during the second time period 920 have been collected and reported, for example, at time T5, the arbiter 130 may request the CPE 110 begin operation on the set of DSL lines. For example, within third time period 930, the CPE 110 may perform an initialization procedure to begin or resume communications. During the initialization period frame between time T5 and time T6, PLC devices 120 may work in a mode that does not interfere with the startup of the CPE 110. Once initialization has been completed (such as once the CPE 110 reaches showtime), the CPE 110 may report a LRN measurement to the arbiter 130 at time T6.

In some cases, at time T7, an arbiter 130 may communicate to a DSL network an expected noise level from a PLC network. During fourth time period 940 a new bit loading may occur on the DSL network and PLC transmission power cutbacks may be determined. For example, the new bit loading may be based on the expected noise level communicated by the arbiter 130. At time T8, an AF may communicate to a PLC network transmission power cutbacks such as a new PSD, based on measurements made during the second time period 920.

The transmission power cutbacks may reduce PLC signal leakage experienced by the CPE 110 on the set of DSL lines. In some cases, individual PLC devices 120 may receive different transmission power cutbacks than other PLC devices 120 on a PLC network. The different transmission power cutbacks may be based on independent PLC signal leakage measurements made for the PLC device 120. Additionally or alternatively, each PLC device 120 on the PLC network may receive a request to perform the same transmission power cutbacks. Following communication of the transmission power cutbacks at time T8, the operating parameters of one or more PLC devices 120 may be adjusted.

As a variation of the noise finder measurement sequence 900 described above, a CPE 110 may implement a PLC signal leakage measurement process while in showtime. For example, a detection or averaging process may be performed on a function of received FFT output data (such as after equalization and demodulation and slicing is performed). The detection and averaging process may be completed based on an estimate of noise collected in a DM mode, as opposed to the actual noise collected while the modem was not receiving or transmitting data during a noise finder measurement sequence. In some cases, part of the detection of the impulse may be carried out on an FFT output of a CM sensor, which, for example, may not carry useful DSL information even when the modem is in showtime.

Figure 10:
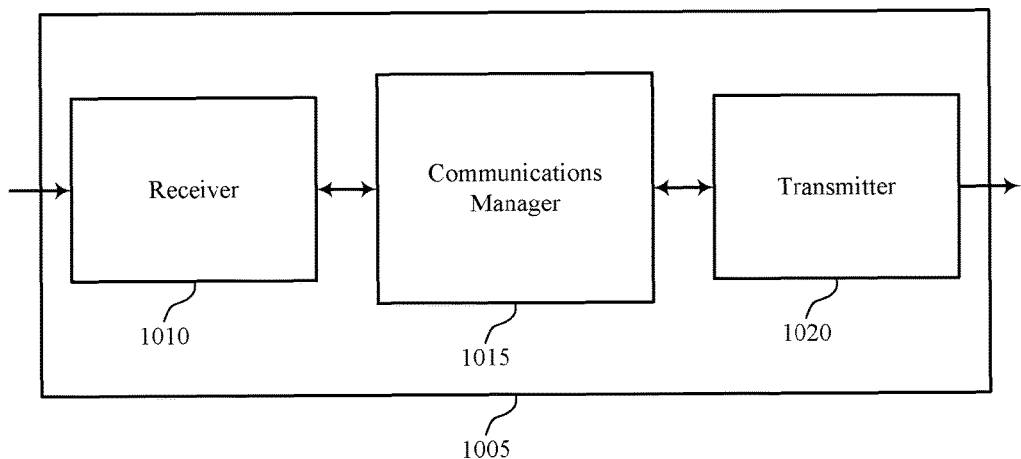
FIGS. 10 through 11 show block diagrams of a device that supports PLC interference probing and measurement on digital subscriber lines.

FIG. 10 shows a block diagram 1000 of a device 1005 that supports PLC interference probing and measurement on digital subscriber lines in accordance with various aspects of the present disclosure. The device 1005 may be an example of aspects of an arbiter 130 or a CPE 110-a through 110-a as described with reference to FIG. 1. For example, the device 1005 may be implemented by a DSL receiver. The device 1005 may include a receiver 1010, a communications manager 1015, and a transmitter 1020. The device 1005 also may include a processor. Each of these components may be in communication with one another (such as via one or more buses).

The receiver 1010 may receive information such as packets, user data, or control information associated with various information channels (such as control channels, data channels, and information related to PLC interference probing and measurement on digital subscriber lines, etc.). Information may be passed on to other components of the device. The receiver 1010 may be an example of aspects of the transceiver 1335 described with reference to FIG. 13.

The communications manager 1015 may be an example of aspects of the communications manager 1315 described with reference to FIG. 13. The communications manager 1015 may detect impulse noise on a set of DSL lines, detect one or more PLC sound packets associated with the detected impulse noise, and measure PLC signal leakage on the set of DSL lines based on the one or more PLC sound packets.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1335 described with reference to FIG. 13.

Figure 11:
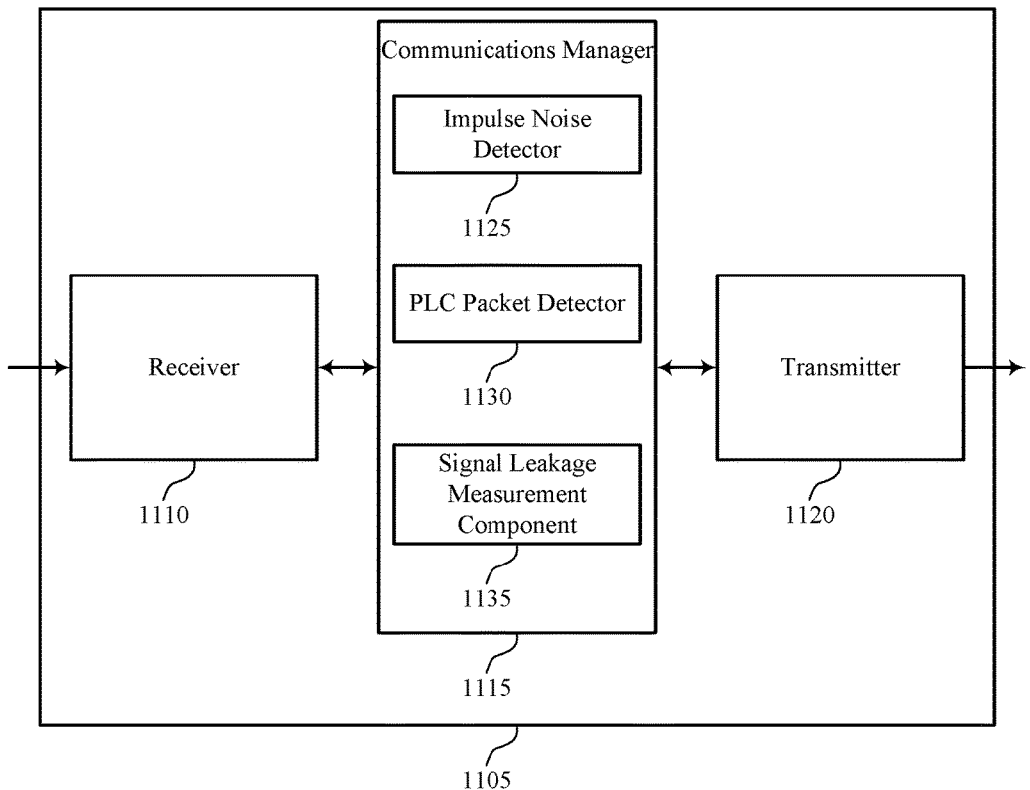

FIG. 11 shows a block diagram 1100 of a device 1105 that supports PLC interference probing and measurement on digital subscriber lines in accordance with various aspects of the present disclosure. The device 1105 may be an example of aspects of an arbiter 130 or a CPE 110-a through 110-a or a device 1005 as described with reference to FIGS. 1 and 10. For example, the device 1105 may be implemented by a DSL receiver. The device 1105 may include a receiver 1110, a communications manager 1115, and a transmitter 1120. The device 1105 also may include a processor. Each of these components may be in communication with one another (such as via one or more buses).

The receiver 1110 may receive information such as packets, user data, or control information associated with various information channels (such as control channels, data channels, and information related to PLC interference probing and measurement on digital subscriber lines, etc.). Information may be passed on to other components of the device 1105. The receiver 1110 may be an example of aspects of the transceiver 1335 described with reference to FIG. 13.

The communications manager 1115 may be an example of aspects of the communications manager 1315 described with reference to FIG. 13. The communications manager 1115 also may include an impulse noise detector 1125, a PLC packet detector 1130, and a signal leakage measurement component 1135. The impulse noise detector 1125 may detect impulse noise on a set of DSL lines. In some cases, the receiver 1110 is a dual sensor receiver including a CM port and a DM port, and the impulse noise is detected using the CM port.

The PLC packet detector 1130 may detect one or more PLC sound packets associated with the detected impulse noise. In some cases, detecting the one or more PLC sound packets further includes: identifying the one or more PLC sound packets based on at least a duration of a PLC sound packet, or a position of the PLC sound packet, or an arrival time of the PLC sound packet relative to a PLC beacon detected over the set of DSL lines. In some cases, the arrival time of the PLC sound packet is associated with an offset from a local time reference. In some cases, the one or more PLC sound packets are interleaved with PLC data traffic. In some cases, the one or more PLC sound packets include a set of MPDU bursts.

The signal leakage measurement component 1135 may measure PLC signal leakage on the set of DSL lines based on the one or more PLC sound packets, transmit the measured PLC signal leakage to the arbiter, and transmit the measured PLC signal leakage to an arbiter. In some cases, measuring the PLC signal leakage includes: computing an instantaneous power value for impulse noise received during a measurement period, where the instantaneous power value is from a group consisting of: a maximum instantaneous power, a minimum instantaneous power, and an average instantaneous power.

The transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13.

Figure 12:
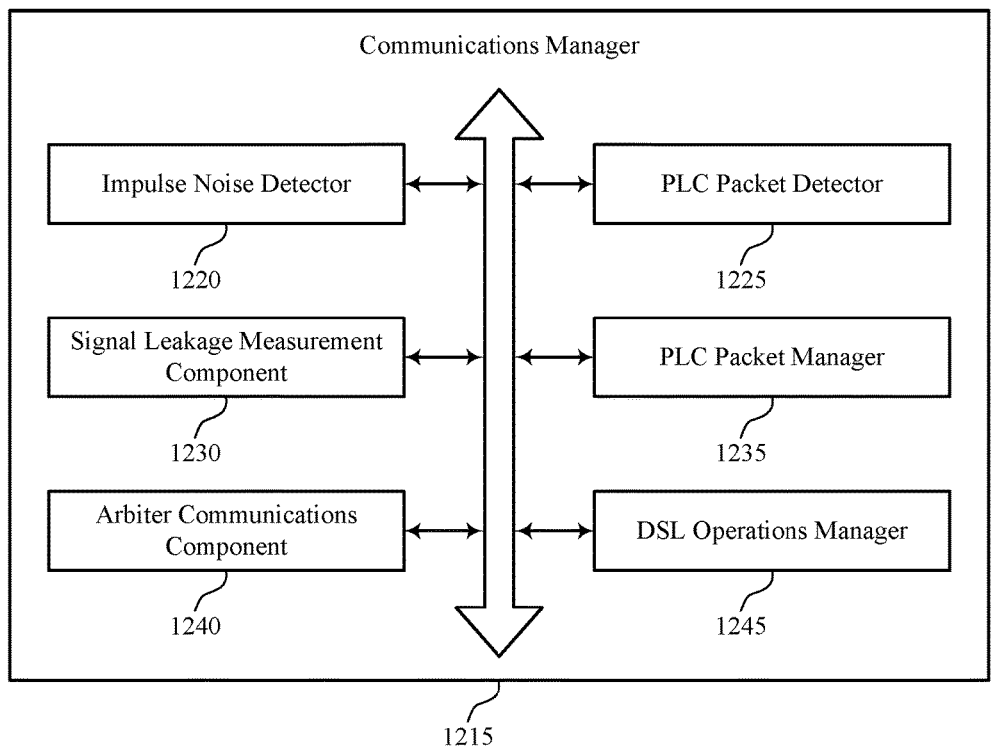
FIG. 12 illustrates a block diagram of a system including a device that supports PLC interference probing and measurement on digital subscriber lines.

FIG. 12 shows a block diagram 1200 of a communications manager 1215 that supports PLC interference probing and measurement on digital subscriber lines in accordance with various aspects of the present disclosure. The communications manager 1215 may be an example of aspects of a communications manager 1015, a communications manager 1115, or a communications manager 1315 as described with reference to FIGS. 10, 11, and 13, respectively. In some implementations, the communications manager 1215 is implemented by a DSL receiver. The communications manager 1215 may include impulse a noise detector 1220, a PLC packet detector 1225, a signal leakage measurement component 1230, a PLC packet manager 1235, an arbiter communications component 1240, and a DSL operations manager 1245. Each of these modules may communicate, directly or indirectly, with one another (such as via one or more buses).

The impulse noise detector 1220 may detect impulse noise on a set of DSL lines. In some cases, the DSL receiver implementing the communications manager 1215 is a dual sensor receiver including a CM port and a DM port, the impulse noise being detected using the CM port.

The PLC packet detector 1225 may detect one or more PLC sound packets associated with the detected impulse noise. In some cases, detecting the one or more PLC sound packets further includes: identifying the one or more PLC sound packets based on at least a duration of a PLC sound packet, or a position of the PLC sound packet, or an arrival time of the PLC sound packet relative to a PLC beacon detected over the set of DSL lines. In some cases, the arrival time of the PLC sound packet is associated with an offset from a local time reference. In some cases, the one or more PLC sound packets are interleaved with PLC data traffic. In some cases, the one or more PLC sound packets include a set of MPDU bursts.

The signal leakage measurement component 1230 may measure PLC signal leakage on the set of DSL lines based on the one or more PLC sound packets, transmit the measured PLC signal leakage to the arbiter, and transmit the measured PLC signal leakage to an arbiter. In some cases, measuring the PLC signal leakage includes: computing an instantaneous power value for impulse noise received during a measurement period, where the instantaneous power value is from a group consisting of: a maximum instantaneous power, a minimum instantaneous power, and an average instantaneous power.

The PLC packet manager 1235 may determine the duration of the PLC sound packet for use by a PLC device and determine the position of the PLC sound packet for use by a PLC device. The arbiter communications component 1240 may receive, from an arbiter communicatively coupled with the DSL receiver, instructions to measure the PLC signal leakage, transmit the determined duration to an arbiter, transmit the determined position to an arbiter, receive operating parameters from the arbiter based on the measured PLC signal leakage, and receive, from the arbiter, instructions to start operation after measuring the PLC signal leakage. The DSL operations manager 1245 may refrain from transmitting over the DSL lines during the measurement of PLC signal leakage.

Figure 13:
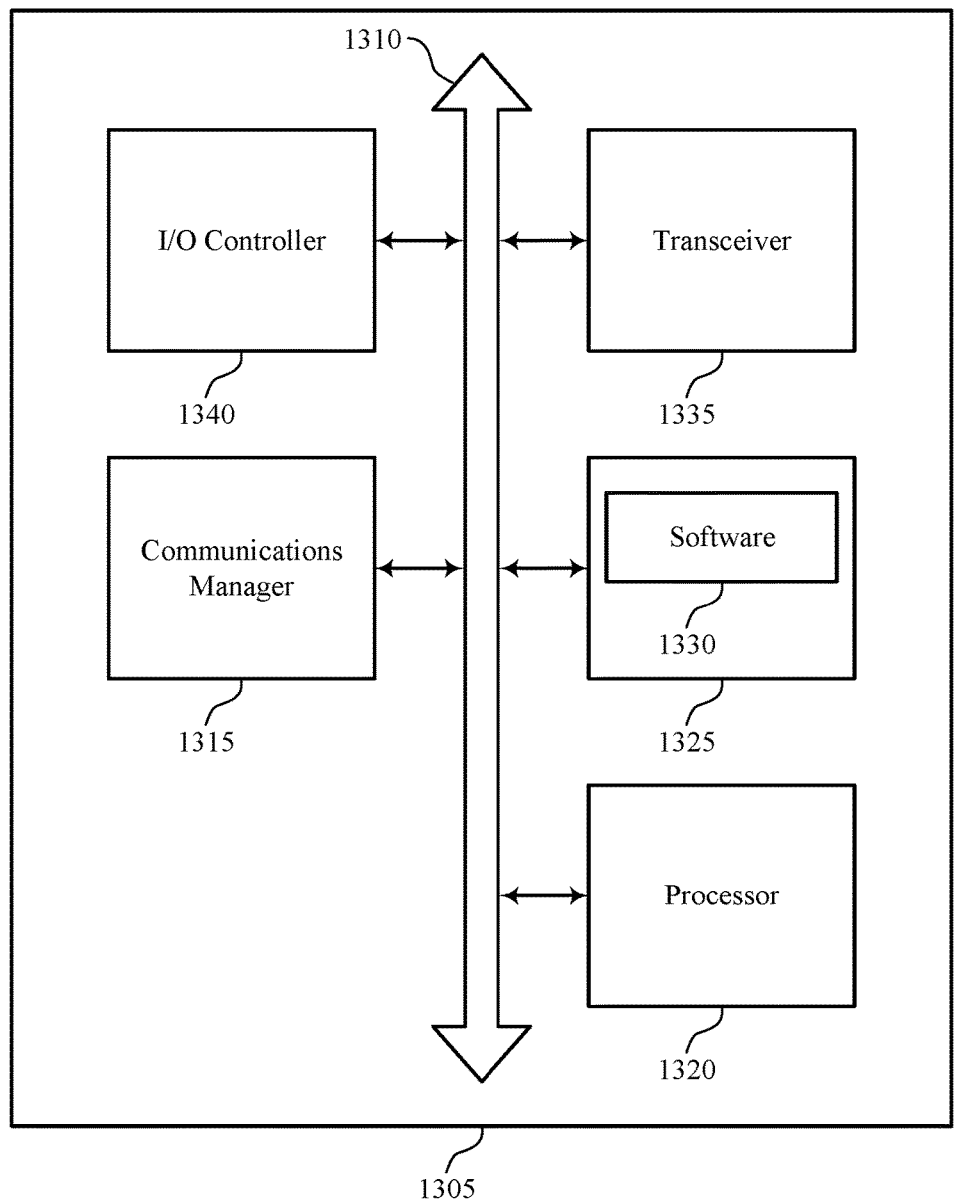
FIGS. 13 through 16 illustrate methods for PLC interference probing and measurement on digital subscriber lines.

FIG. 13 shows a diagram of a system 1300 including a device 1305 that supports PLC interference probing and measurement on digital subscriber lines in accordance with various aspects of the present disclosure. The device 1305 may be an example of or include the components of the device 1005, the device 1105, or the device 110 described above, such as with reference to FIGS. 1, 10 and 11. The device 1305 may include components for bi-directional voice and data communications including components for transmitting and receiving communications, including a communications manager 1315, a processor 1320, a memory 1325, software 1330, a transceiver 1335, and an input/output (I/O) controller 1340. These components may be in electronic communication via one or more busses (such as bus 1310).

The processor 1320 may include an intelligent hardware device, (such as a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, the processor 1320 may be configured to operate a memory array using a memory controller. In other cases, a memory controller may be integrated into the processor 1320. The processor 1320 may be configured to execute computer-readable instructions stored in a memory to perform various functions (such as functions or tasks supporting PLC interference probing and measurement on digital subscriber lines).

The memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

The software 1330 may include code to implement aspects of the present disclosure, including code to support PLC interference probing and measurement on digital subscriber lines. The software 1330 may be stored in a non-transitory computer-readable medium such as system memory or other memory. In some cases, the software 1330 may not be directly executable by the processor but may cause a computer (such as when compiled and executed) to perform functions described herein.

The transceiver 1335 may communicate bi-directionally, via one or more wired links as described above. For example, the transceiver 1335 may represent a transceiver and may communicate bi-directionally with another transceiver. The transceiver 1335 also may include a modem to modulate the packets for transmission, and to demodulate received packets.

The I/O controller 1340 may manage input and output signals for device 1305. The I/O controller 1340 also may manage peripherals not integrated into device 1305. In some cases, the I/O controller 1340 may represent a physical connection or port to an external peripheral. In some cases, the I/O controller 1340 may utilize an operating system such as iOS®, ANDROID®, MS-DOS®, MS-WINDOWS®, OS/2®, UNIX®, LINUX®, or another known operating system.

Figure 14:
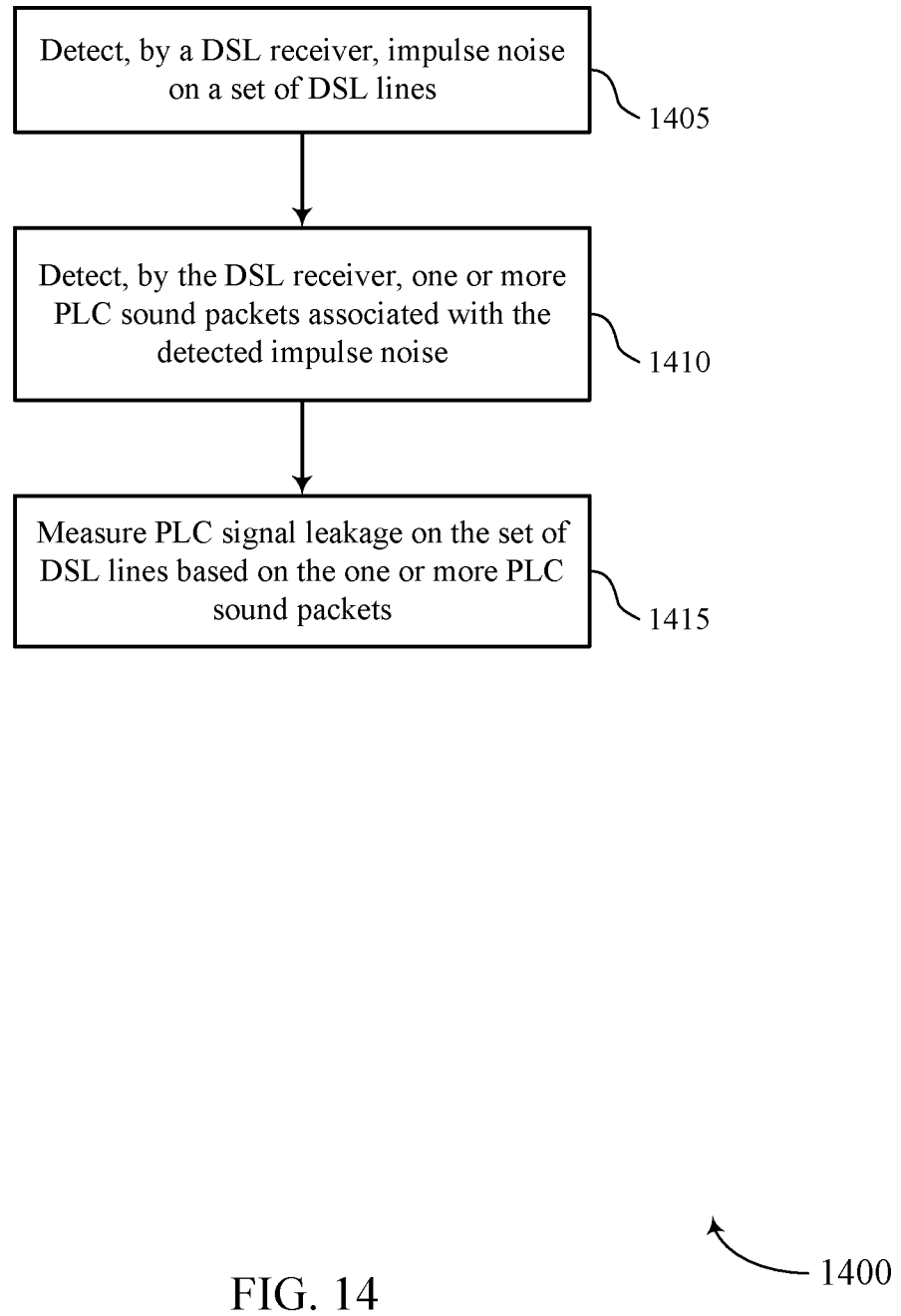

FIG. 14 shows a flowchart illustrating a method 1400 for PLC interference probing and measurement on digital subscriber lines in accordance with various aspects of the present disclosure. The operations of method 1400 may be implemented by a device 110, such as a CPE 110 or a DSL receiver, or its components as described herein. For example, the operations of method 1400 may be performed by a communications manager as described with reference to FIGS. 10 through 13. In some examples, a device 110 may execute a set of codes to control the functional elements of the device to perform the functions described below. Additionally or alternatively, the device 110 may perform aspects the functions described below using special-purpose hardware.

At block 1405 the device 110 may detect impulse noise on a set of DSL lines. The operations of block 1405 may be performed according to the methods described with reference to FIGS. 1 through 9. In certain examples, aspects of the operations of block 1405 may be performed by an impulse noise detector 1125 or impulse noise detector 1225 as described with reference to FIGS. 10 through 13.

At block 1410 the device 110 may detect one or more PLC sound packets associated with the detected impulse noise. The operations of block 1410 may be performed according to the methods described with reference to FIGS. 1 through 9. In certain examples, aspects of the operations of block 1410 may be performed by a PLC packet detector 1130 or a PLC packet detector 1225 as described with reference to FIGS. 10 through 13.

At block 1415 the device 110 may measure PLC signal leakage on the set of DSL lines based on the one or more PLC sound packets. The operations of block 1415 may be performed according to the methods described with reference to FIGS. 1 through 9. In certain examples, aspects of the operations of block 1415 may be performed by a signal leakage measurement component 1135 or a signal leakage measurement component 1230 as described with reference to FIGS. 10 through 13.

Figure 15:
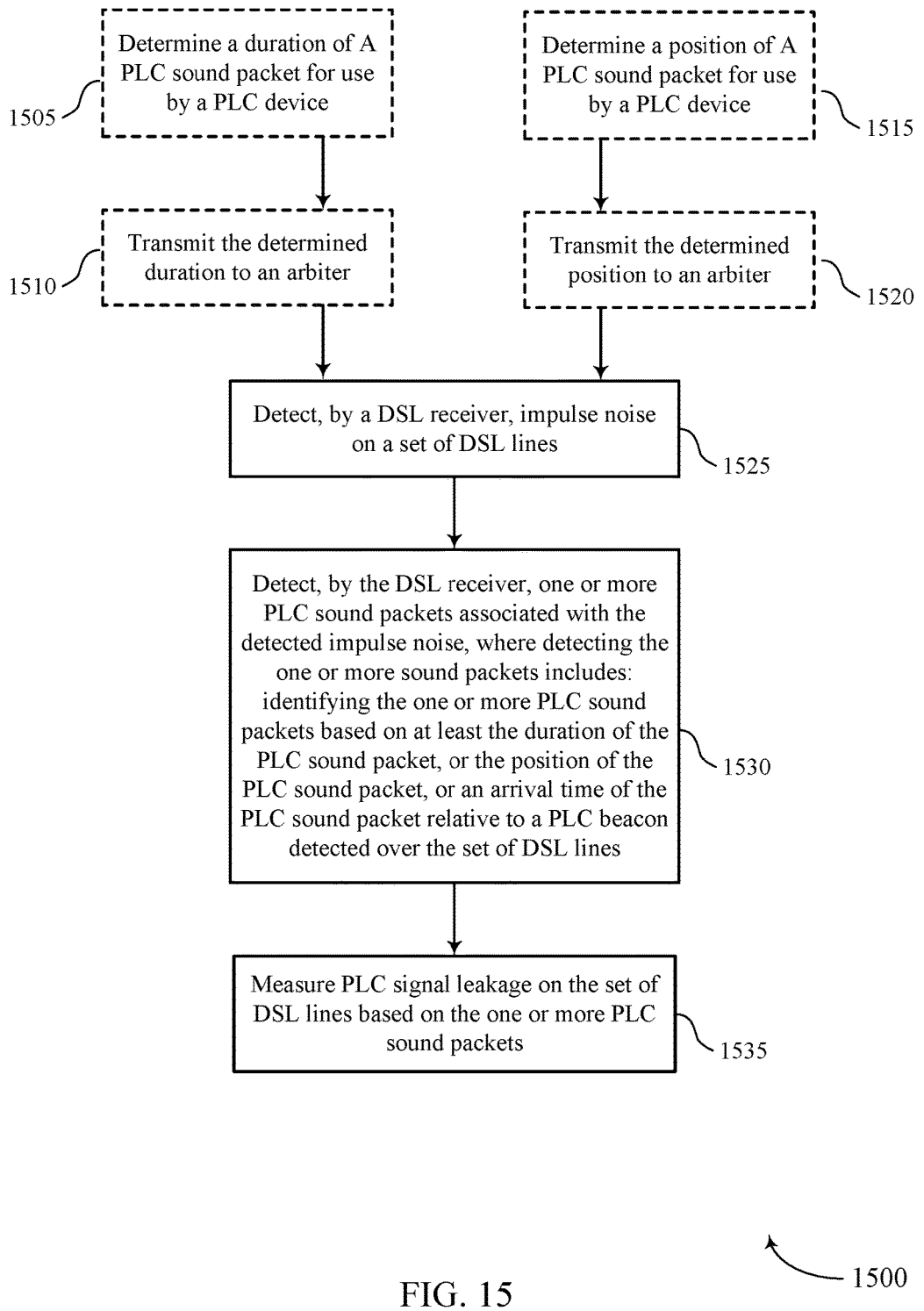

FIG. 15 shows a flowchart illustrating a method 1500 for PLC interference probing and measurement on digital subscriber lines in accordance with various aspects of the present disclosure. The operations of method 1500 may be implemented by a device 110, such as a CPE 110 or a DSL receiver, or its components as described herein. For example, the operations of method 1500 may be performed by a communications manager 1015, a communications manager 1115, or a communications manager 1215 as described with reference to FIGS. 10 through 13. In some examples, a device 110 may execute a set of codes to control the functional elements of the device to perform the functions described below. Additionally or alternatively, the device 110 may perform aspects the functions described below using special-purpose hardware.

At block 1505 the device 110 may optionally determine the duration of the PLC sound packet for use by a PLC device. The operations of block 1505 may be performed according to the methods described with reference to FIGS. 1 through 9. In certain examples, aspects of the operations of block 1505 may be performed by a PLC packet manager 1235 as described with reference to FIGS. 10 through 13.

At block 1510 the device 110 may transmit the determined duration to an arbiter. The operations of block 1510 may be performed according to the methods described with reference to FIGS. 1 through 9. In certain examples, aspects of the operations of block 1510 may be performed by an arbiter communications component 1240 as described with reference to FIGS. 10 through 13.

At block 1515 the device 110 may optionally determine the position of the PLC sound packet for use by a PLC device. The operations of block 1515 may be performed according to the methods described with reference to FIGS. 1 through 9. In certain examples, aspects of the operations of block 1515 may be performed by a PLC packet manager 1235 as described with reference to FIGS. 10 through 13.

At block 1520 the device 110 may transmit the determined position to an arbiter. The operations of block 1520 may be performed according to the methods described with reference to FIGS. 1 through 9. In certain examples, aspects of the operations of block 1520 may be performed by an arbiter communications component 1240 as described with reference to FIGS. 10 through 13.

At block 1525 the device 110 may detect impulse noise on a set of DSL lines. The operations of block 1525 may be performed according to the methods described with reference to FIGS. 1 through 9. In certain examples, aspects of the operations of block 1525 may be performed by an impulse noise detector 1220 as described with reference to FIGS. 10 through 13.

At block 1530 the device 110 may detect one or more PLC sound packets associated with the detected impulse noise. In some cases, detecting the one or more PLC sound packets further includes identifying the one or more PLC sound packets based on at least a duration of a PLC sound packet, or a position of the PLC sound packet, or an arrival time of the PLC sound packet relative to a PLC beacon detected over the set of DSL lines. The operations of block 1530 may be performed according to the methods described with reference to FIGS. 1 through 9. In certain examples, aspects of the operations of block 1530 may be performed by a PLC packet detector 1130 or a PLC packet detector 1225 as described with reference to FIGS. 10 through 13.

At block 1535 the device 110 may measure PLC signal leakage on the set of DSL lines based on the one or more PLC sound packets. The operations of block 1535 may be performed according to the methods described with reference to FIGS. 1 through 9. In certain examples, aspects of the operations of block 1535 may be performed by a signal leakage measurement component 1135 or a signal leakage measurement component 1230 as described with reference to FIGS. 10 through 13.

Figure 16:
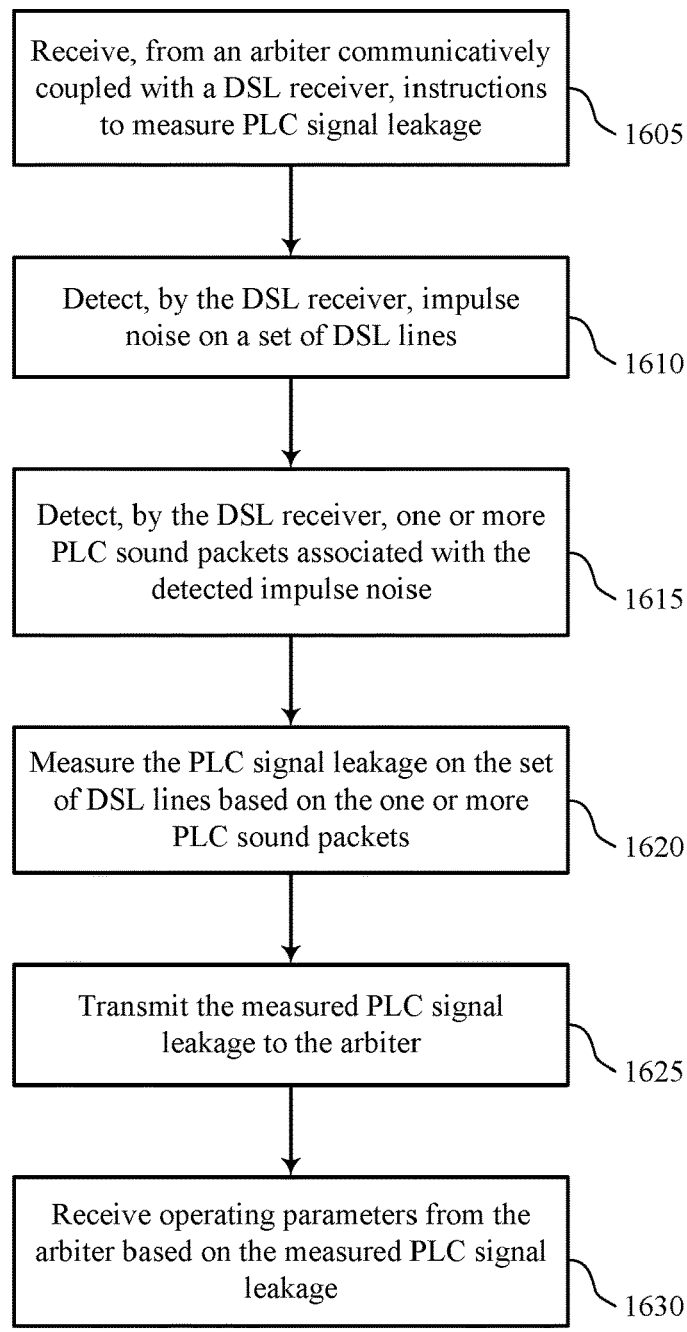

FIG. 16 shows a flowchart illustrating a method 1600 for PLC interference probing and measurement on digital subscriber lines in accordance with various aspects of the present disclosure. The operations of method 1600 may be implemented by a device 110, such as a CPE 110, or its components as described herein. For example, the operations of method 1600 may be performed by a communications manager 1015, a communications manager 1115, or a communications manager 1215 as described with reference to FIGS. 10 through 13. In some examples, a device 110 may execute a set of codes to control the functional elements of the device to perform the functions described below. Additionally or alternatively, the device 110 may perform aspects the functions described below using special-purpose hardware.

At block 1605 the DSL receiver may detect impulse noise on a set of DSL lines. The operations of block 1605 may be performed according to the methods described with reference to FIGS. 1 through 9. In certain examples, aspects of the operations of block 1605 may be performed by an arbiter communications component 1240 as described with reference to FIGS. 10 through 13.

At block 1610 the device 110 may detect, by a DSL receiver, impulse noise on a set of DSL lines. The operations of block 1610 may be performed according to the methods described with reference to FIGS. 1 through 9. In certain examples, aspects of the operations of block 1610 may be performed by an impulse noise detector 1220 as described with reference to FIGS. 10 through 13.

At block 1615 the DSL receiver may detect one or more PLC sound packets associated with the detected impulse noise. The operations of block 1615 may be performed according to the methods described with reference to FIGS. 1 through 9. In certain examples, aspects of the operations of block 1615 may be performed by a PLC packet detector 1225 as described with reference to FIGS. 10 through 13.

At block 1620 the device 110 may measure PLC signal leakage on the set of DSL lines based on the one or more PLC sound packets. The operations of block 1620 may be performed according to the methods described with reference to FIGS. 1 through 9. In certain examples, aspects of the operations of block 1620 may be performed by a signal leakage measurement component 1135 or a signal leakage measurement component 1230 as described with reference to FIGS. 10 through 13.

At block 1625 the device 110 may transmit the measured PLC signal leakage to the arbiter. The operations of block 1625 may be performed according to the methods described with reference to FIGS. 1 through 9. In certain examples, aspects of the operations of block 1625 may be performed by a signal leakage measurement component 1135 or a signal leakage measurement component 1230 as described with reference to FIGS. 10 through 13.

At block 1630 the device 110 may receive operating parameters from the arbiter based on the measured PLC signal leakage. The operations of block 1630 may be performed according to the methods described with reference to FIGS. 1 through 9. In certain examples, aspects of the operations of block 1630 may be performed by an arbiter communications component 1240 as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and features disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c. Also, as used herein, the phrase "based on" shall not be construed as a reference to a closed set of conditions. For example, an implementation, process or procedure that is described as "based on condition A" may be based on both a condition A and a condition B without departing from the scope of the present disclosure. In other words, as used herein, the phrase "based on" shall be construed in the same manner as the phrase "based at least in part on."

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor may be a microprocessor, or, any conventional processor, controller, microcontroller or state machine. A processor also may be implemented as a combination of computing devices, such as a combination of a DSP and a microprocessor, a plurality of microprocessors, one or more microprocessors in conjunction with a DSP core or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireline communications, comprising:
   a processor;
   memory in electronic communication with the processor; and
   instructions stored in the memory and operable, when executed by the processor, to cause the apparatus to:
   detect, by a digital subscriber line (DSL) receiver, impulse noise on a set of DSL lines;
   detect, by the DSL receiver, one or more power line communication (PLC) sound packets associated with the detected impulse noise based at least in part on a duration of the PLC sound packet; and
   measure PLC signal leakage on the set of DSL lines based at least in part on the one or more PLC sound packets.

2. The apparatus of claim 1, wherein the instructions executable by the processor to detect the one or more PLC sound packets further comprise instructions executable by the processor to:
   identify the one or more PLC sound packets based at least in part on a position of the PLC sound packet or an arrival time of the PLC sound packet relative to a PLC beacon detected over the set of DSL lines.

3. The apparatus of claim 1, wherein the instructions are further executable by the processor to:
   determine the duration of the PLC sound packet for use by a PLC device;
   compare the duration of the detected impulse noise to the duration of the PLC sound packet; and
   transmit the determined duration to an arbiter.

4. The apparatus of claim 2, wherein the instructions are further executable by the processor to:
   determine the position of the PLC sound packet for use by a PLC device; and
   transmit the determined position to an arbiter.

5. The apparatus of claim 2, wherein the arrival time of the PLC sound packet is associated with an offset from a local time reference.

6. The apparatus of claim 2, wherein the instructions are further executable by the processor to:
receive, from an arbiter, at least the duration of the PLC sound packet or the position of the PLC sound packet used by a PLC device.

7. The apparatus of claim 1, wherein measuring the PLC signal leakage comprises:
computing an instantaneous power value for impulse noise received during a measurement period, wherein the instantaneous power value is from a group consisting of: a maximum instantaneous power, a minimum instantaneous power, and an average instantaneous power.

8. The apparatus of claim 1, wherein the one or more PLC sound packets are interleaved with PLC data traffic.

9. The apparatus of claim 1, wherein the instructions are further executable by the processor to:
receive, from an arbiter communicatively coupled with the DSL receiver, instructions to measure the PLC signal leakage; and
transmit the measured PLC signal leakage to the arbiter.

10. The apparatus of claim 9, wherein the instructions are further executable by the processor to:
receive operating parameters from the arbiter based at least in part on the measured PLC signal leakage.

11. The apparatus of claim 1, wherein the instructions are further executable by the processor to:
transmit the measured PLC signal leakage to an arbiter; and
receive, from the arbiter, instructions to start operation after measuring the PLC signal leakage.

12. The apparatus of claim 1, wherein the instructions are further executable by the processor to:
refrain from transmitting over the set of DSL lines during the measurement of PLC signal leakage.

13. The apparatus of claim 1, wherein the DSL receiver is a dual sensor receiver comprising a common mode (CM) port and a differential mode (DM) port, and wherein the impulse noise is detected using the CM port.

14. The apparatus of claim 1, wherein the one or more PLC sound packets comprise a set of medium access control protocol data unit (MPDU) bursts.

15. A method for wireline communications, comprising:
detecting, by a digital subscriber line (DSL) receiver, impulse noise on a set of DSL lines;
detecting, by the DSL receiver, one or more power line communication (PLC) sound packets associated with the detected impulse noise based at least in part on a duration of the PLC sound packet; and
measuring PLC signal leakage on the set of DSL lines based at least in part on the one or more PLC sound packets.

16. The method of claim 15, wherein detecting the one or more PLC sound packets further comprises:
identifying the one or more PLC sound packets based at least in part on a position of the PLC sound packet or an arrival time of the PLC sound packet relative to a PLC beacon detected over the set of DSL lines.

17. The method of claim 15, further comprising:
determining the duration of the PLC sound packet for use by a PLC device;
comparing the duration of the detected impulse noise to the duration of the PLC sound packet; and
transmitting the determined duration to an arbiter.

18. The method of claim 16, further comprising:
determining the position of the PLC sound packet for use by a PLC device; and
transmitting the determined position to an arbiter.

19. The method of claim 16, wherein the arrival time of the PLC sound packet is associated with an offset from a local time reference.

20. The method of claim 16, further comprising:
receiving, from an arbiter, at least the duration of the PLC sound packet or the position of the PLC sound packet used by a PLC device.

21. The method of claim 15, wherein measuring the PLC signal leakage comprises:
computing an instantaneous power value for impulse noise received during a measurement period, wherein the instantaneous power value is from a group consisting of: a maximum instantaneous power, a minimum instantaneous power, and an average instantaneous power.

22. The method of claim 15, wherein the one or more PLC sound packets are interleaved with PLC data traffic.

23. The method of claim 15, further comprising:
receiving, from an arbiter communicatively coupled with the DSL receiver, instructions to measure the PLC signal leakage; and
transmitting the measured PLC signal leakage to the arbiter.

24. The method of claim 23, further comprising:
receiving operating parameters from the arbiter based at least in part on the measured PLC signal leakage.

25. The method of claim 15, further comprising:
transmitting the measured PLC signal leakage to an arbiter; and
receiving, from the arbiter, instructions to start operation after measuring the PLC signal leakage.

26. The method of claim 15, further comprising:
refraining from transmitting over the set of DSL lines during the measurement of PLC signal leakage.

27. The method of claim 15, wherein the DSL receiver is a dual sensor receiver comprising a common mode (CM) port and a differential mode (DM) port, and wherein the impulse noise is detected using the CM port.

28. The method of claim 15, wherein the one or more PLC sound packets comprise a set of medium access control protocol data unit (MPDU) bursts.

29. An apparatus for wireline communications, comprising:
means for detecting, by a digital subscriber line (DSL) receiver, impulse noise on a set of DSL lines;
means for detecting, by the DSL receiver, one or more power line communication (PLC) sound packets associated with the detected impulse noise based at least in part on a duration of the PLC sound packet; and
means for measuring PLC signal leakage on the set of DSL lines based at least in part on the one or more PLC sound packets.

30. A non-transitory computer readable medium storing code for wireline communications, the code comprising instructions executable by a processor to:
detect, by a digital subscriber line (DSL) receiver, impulse noise on a set of DSL lines;
detect, by the DSL receiver, one or more power line communication (PLC) sound packets associated with the detected impulse noise based at least in part on a duration of the PLC sound packet; and
measure PLC signal leakage on the set of DSL lines based at least in part on the one or more PLC sound packets.

* * * * *